(12) United States Patent
Story

(10) Patent No.: US 8,215,367 B1
(45) Date of Patent: Jul. 10, 2012

(54) SELF-ADVANCING WHEEL SERVICING TOOL ASSEMBLY

(75) Inventor: John Story, Murfreesboro, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 0 days.

(21) Appl. No.: 12/869,803

(22) Filed: Aug. 27, 2010

Related U.S. Application Data

(63) Continuation of application No. 12/861,644, filed on Aug. 23, 2010.

(51) Int. Cl.
*B60C 25/132* (2006.01)

(52) U.S. Cl. ..................... 157/1.17; 157/1.24

(58) Field of Classification Search .............. 157/1.17, 157/1.24, 1.26, 1.28
See application file for complete search history.

(56) References Cited

U.S. PATENT DOCUMENTS

| | | | |
|---|---|---|---|
| 5,226,465 A * | 7/1993 | Schon et al. | 157/1.28 |
| 5,287,907 A * | 2/1994 | Kawabe et al. | 157/1 |
| 6,044,888 A | 4/2000 | Cunningham et al. | |
| 6,109,327 A | 8/2000 | Gonzaga | |
| 6,182,736 B1 | 2/2001 | Cunningham et al. | |
| 6,422,285 B1 * | 7/2002 | Gonzaga | 157/1.24 |
| 7,096,150 B2 * | 8/2006 | Shavers et al. | 702/157 |
| 7,455,097 B2 * | 11/2008 | Bonacini | 157/1.24 |
| 2003/0150565 A1 * | 8/2003 | Gonzaga | 157/1.28 |
| 2007/0074824 A1 * | 4/2007 | Lawson et al. | 157/1.24 |
| 2009/0266494 A1 * | 10/2009 | Sotgiu | 157/1.24 |
| 2010/0108271 A1 * | 5/2010 | Matteucci | 157/1.24 |

OTHER PUBLICATIONS

Hunter Engineering Company—"Auto 34" Brochure—Pub. Date Unknown.
Corghi US—"Artiglio 50" Brochure—Pub. Date Unknown.
Corghi US—"Master 26" Brochure—Pub. Date Unknown.

* cited by examiner

*Primary Examiner* — David B Thomas
(74) *Attorney, Agent, or Firm* — Waddey & Patterson, P.C.; Mark J. Patterson; Michael C. Cox

(57) ABSTRACT

A wheel servicing machine provides a rotatable shaft having a retractable rod slidably disposed in a center bore of the rotatable shaft, wherein the retractable rod is longitudinally moveable relative to the shaft. A rotatable locking member is disposed on the distal end of the retractable rod. The locking member includes one or more mounting studs protruding radially therefrom for engaging a centering cone or a wheel clamp. A support arm including a travel stage protrudes from the base. A tool adapted for engaging a sidewall of a tire is attached to the support arm. A second stage including a second tool configured for engaging the opposite sidewall of the tire may also extend from the base. A platform assembly having one or more spring-loaded rollers is attached to the base in some embodiments. A longitudinally moveable travel arm includes a jointed auxiliary arm extending therefrom. A wheel clamp includes a plurality of arms, wherein at least one arm is moveable relative to at least one other arm. A method of securing a wheel to a wheel servicing machine is also provided.

21 Claims, 33 Drawing Sheets

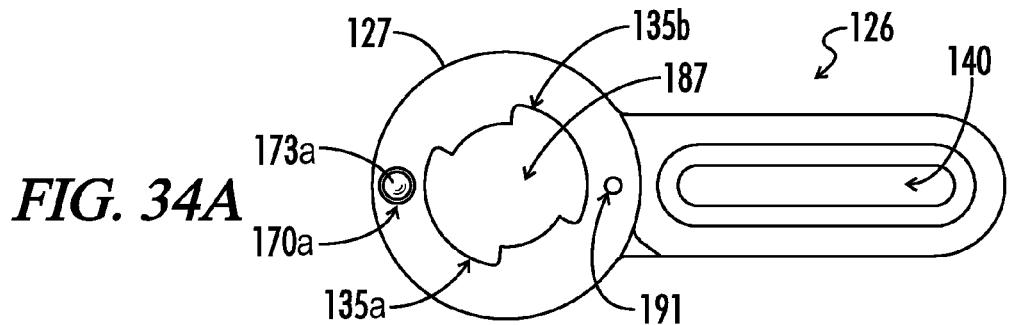
*FIG. 34A*
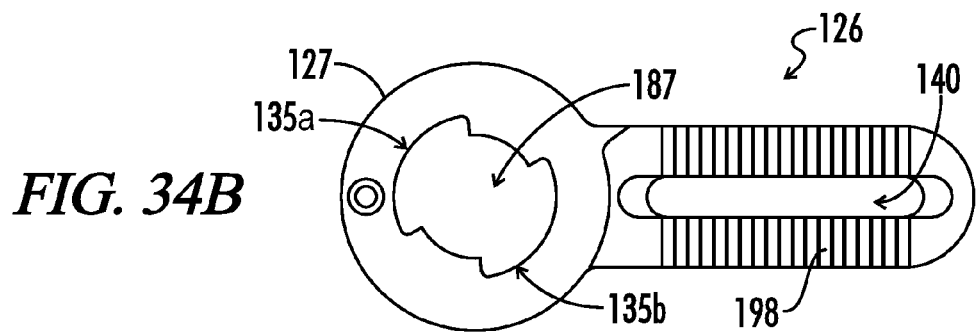
*FIG. 34B*
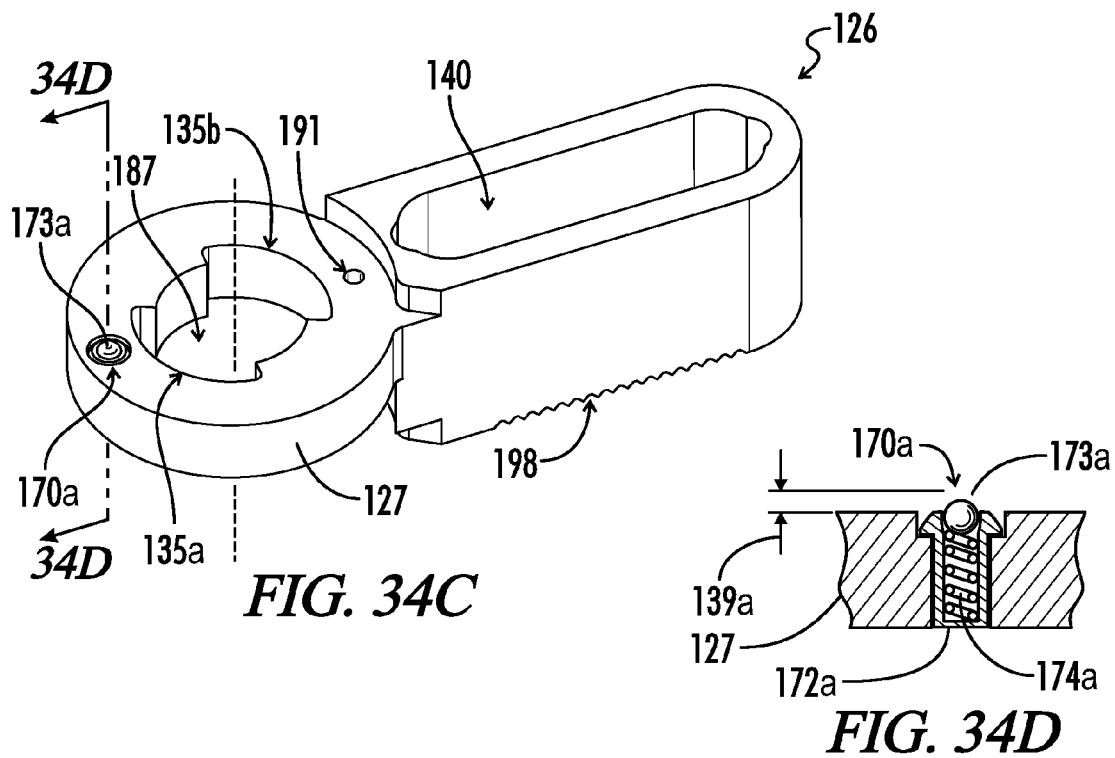
*FIG. 34C*
*FIG. 34D*

SELF-ADVANCING WHEEL SERVICING TOOL ASSEMBLY

BACKGROUND OF THE INVENTION

1. Field of the Invention

The present invention relates generally to machinery and tools for servicing, installing, balancing or repairing tires and wheels. More particularly, the present invention pertains to wheel servicing machines and hardware and methods of using the same.

2. Description of the Related Art

Machines for servicing automobile wheels are known in the art. More particularly, tire changing machines configured for mounting and/or dismounting tires and wheels are used by tire retailers and vehicle repair shops of all kinds. Commercial wheel servicing machines of this type generally must be adaptable for use with different wheel types and configurations. A tire changing machine typically must engage and securely hold the wheel during servicing operations so that a tire can be either removed from or mounted onto the wheel.

Conventional wheel servicing machines known in the art typically include a shaft on which a wheel assembly is mounted for performing wheel servicing operations on the wheel. Common wheel servicing operations such as tire mounting and dismounting require engaging the tire side wall or tire bead with a tool. Conventional tools known and used in the art for engaging tires during mounting and dismounting require using a prybar or other device for inserting into a gap between the tire and rim. Insertion of such conventional tools can cause damage to the tire, the wheel rim or both.

What is needed then are improvements to the devices and methods for performing wheel servicing operations.

BRIEF SUMMARY OF THE INVENTION

One embodiment of the present invention provides a wheel servicing machine for applying force to a tire on a wheel assembly mounted on the machine. The machine includes a base and a rotatable shaft extending from the base. The rotatable shaft defines a shaft axis of rotation. A first support arm extends longitudinally from the base, and a first travel stage is mounted on the first support arm. The first travel stage defines a first travel axis. A first roller tool is disposed on the first travel stage, and the first travel axis is oriented at a non-perpendicular first travel angle relative to a reference axis, the reference axis being oriented substantially parallel to the shaft axis of rotation.

Yet another embodiment of the present invention provides a wheel servicing machine for applying force to a tire positioned on the machine. The machine includes a base and a first support arm extending from the base toward the tire. The first support arm is longitudinally moveable between the tire and the base. A first tool assembly including a ratcheting linear travel stage is disposed on the first support arm. A powered cylinder is disposed on the base operatively connected to the first support arm for moving the first support arm longitudinally relative to the base. A powered ratchet cylinder is disposed on the linear travel stage operative for releasing the ratchet engagement when the first support arm is moved longitudinally.

Another embodiment of the present invention provides a ratcheting travel stage apparatus for use on a support arm for supporting a roller tool on a wheel servicing machine. The apparatus includes a stage base, a stage platform slidably disposed on the stage base, and a powered ratchet cylinder attached to the stage base having a ratchet rod projecting toward the stage platform. A base ratchet member is attached to the ratchet rod, and a platform ratchet member is attached to the stage platform engaging the base ratchet member. A longitudinal control is operatively connected to both the support arm and the powered ratchet cylinder.

A further embodiment of the present invention provides a tire changer apparatus for removing a tire from a wheel. The apparatus includes a base, a rotatable shaft extending from the base, and a support arm extending from the base. The support arm includes a ratcheting travel stage oriented at a non-perpendicular travel angle relative to a reference axis. The reference axis is oriented parallel to the shaft axis of rotation. The support arm includes a longitudinal control for controlling the longitudinal position of the support arm relative to the shaft. A first roller tool extends from the ratcheting travel stage, and the first roller tool is both longitudinally and radially moveable relative to the shaft using only the longitudinal control.

An additional embodiment of the present invention provides a tire changing apparatus for performing wheel servicing operations on a tire. The apparatus includes a base and a rotatable shaft extending from the base. A support arm extends from the base toward the tire, and the support arm includes a ratcheting travel stage disposed thereon. A first roller tool is mounted on the ratcheting travel stage. The first roller tool engages the tire and self-advances radially toward the shaft when the first roller tool is pressed longitudinally against the tire in some embodiments.

BRIEF DESCRIPTION OF THE SEVERAL VIEWS OF THE DRAWINGS

FIG. 34A illustrates an outer side plan view of one embodiment of a second arm in accordance with the present invention.

FIG. 34B illustrates an inner side plan view of one embodiment of a second arm in accordance with the present invention.

FIG. 34C illustrates a perspective view of the second arm of FIG. 34A in accordance with the present invention.

FIG. 34D illustrates a partial detail cross-sectional view of Section 34D-34D of FIG. 34C.

DETAILED DESCRIPTION OF THE INVENTION

Figure 1:
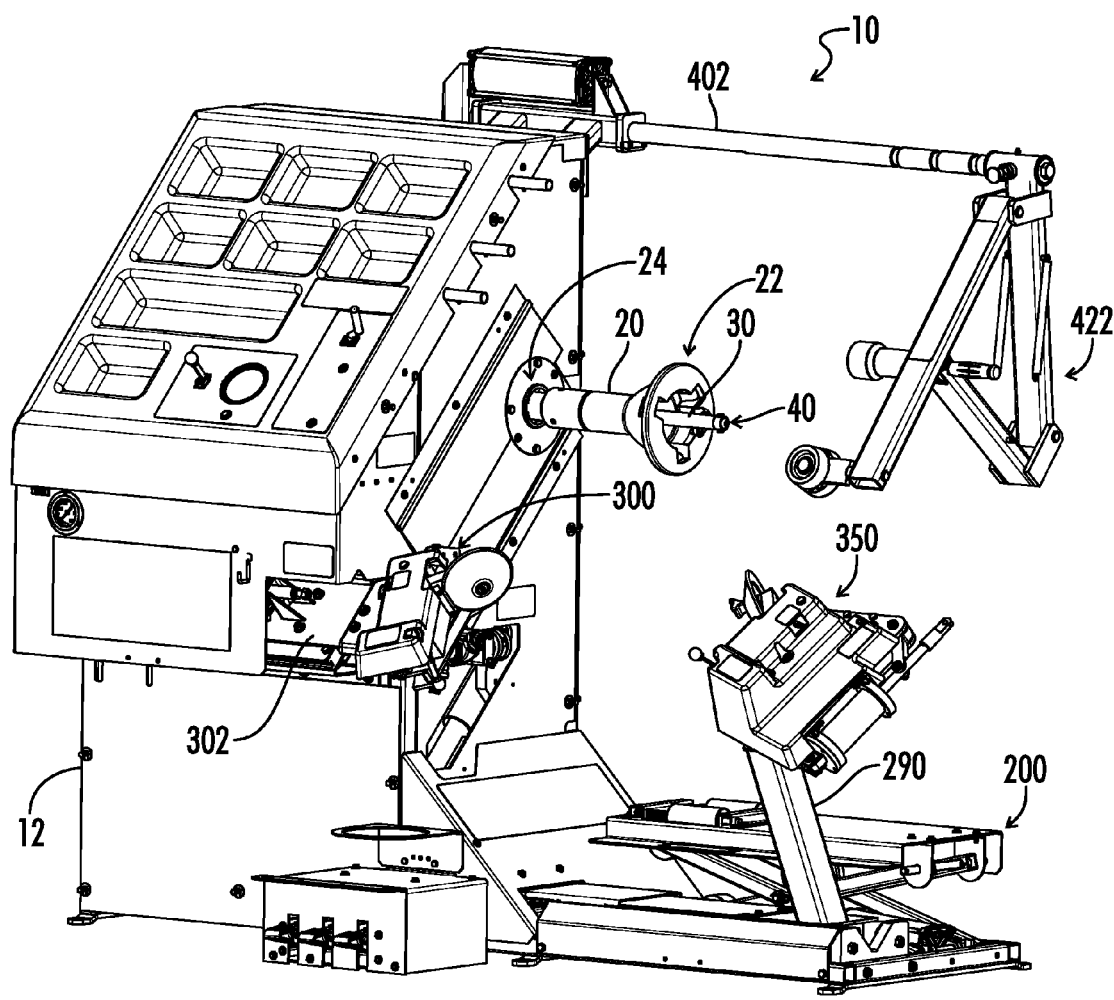
FIG. 1 illustrates an isometric perspective view of one embodiment of a tire changing apparatus in accordance with the present invention.

Referring now to the drawings, FIG. 1 illustrates a perspective view of one embodiment of a wheel servicing machine generally designated by the numeral 10. In the drawings, not all reference numbers are included in each drawing, for the sake of clarity. In addition, positional terms such as "horizontal," "vertical," "upper," "lower," "side," "top," "bottom," etc. refer to the apparatus when in the orientation shown in the drawing. The skilled artisan will recognize that the apparatus can assume different orientations when in use.

Referring now to FIG. 1, one embodiment of a wheel servicing machine, or tire changing machine 10, generally includes a console, or base 12, having a rotatable shaft 20 extending therefrom. In some embodiments, rotatable shaft 20 generally extends from base 12 in a substantially horizontal orientation relative to the ground. It will be appreciated by those of skill in the art that other embodiments in accordance with the present invention can include a rotatable shaft 20 generally extending from base 12 in an angled or vertical orientation.

Rotatable shaft 20 generally includes a distal end 22 extending from wheel servicing machine 10 and a proximal end 24 operatively coupled to wheel servicing machine 10. Proximal end 24 is generally operatively coupled to a drive mechanism or means for rotating the shaft 20. In some embodiments, the drive means is housed inside base 12 and includes an electric motor mechanically linked to shaft 20.

Retractable Rod

Figure 2:
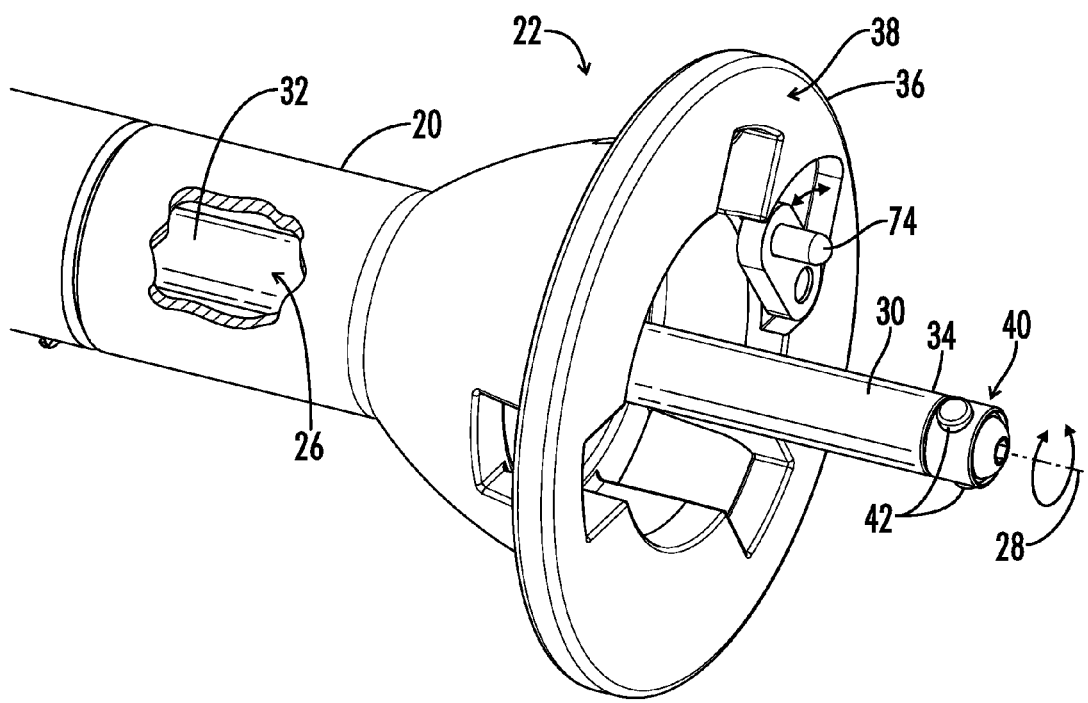
FIG. 2 illustrates a detail perspective view of one embodiment of a rotatable shaft assembly in accordance with the present invention.

Referring now to FIG. 2, rotatable shaft 20 generally rotates about a shaft axis of rotation 28. In some embodiments, rotatable shaft 20 defines a center bore 26 extending substantially along the shaft axis of rotation 28. A retractable rod 30 is generally disposed in center bore 26. Retractable rod 30 includes a first end 32 slidably disposed in center bore 26 of rotatable shaft 20 and a second end 34 protruding from rotatable shaft 20. A locking member 40 is rotatably mounted on the second end 34 of retractable rod 30. The locking member 40 includes at least one mounting stud 42 extending radially outward from the locking member 40. During wheel servicing operations, or when mounting or removing a wheel assembly from machine 10, retractable rod 30 can move axially relative to rotatable shaft 20 through center bore 26.

In one embodiment, locking member 40 is adapted to rotate freely relative to retractable rod 30 in one angular direction and to angularly lock relative to retractable rod 30 when rotated in the opposite angular direction. It is understood by those of skill in the art that angular rotation of locking member 40 relative to retractable rod 30 can be restricted using various mechanical structures positioned between retractable rod 30 and locking member 40, including but not limited to a ratchet, a spring and pawl, or a threaded engagement. In one exemplary embodiment of a locking member 40, a threaded engagement is provided between locking member 40 and retractable rod 30 for restricting free angular movement of locking member 40 to only one angular direction.

Figure 3:
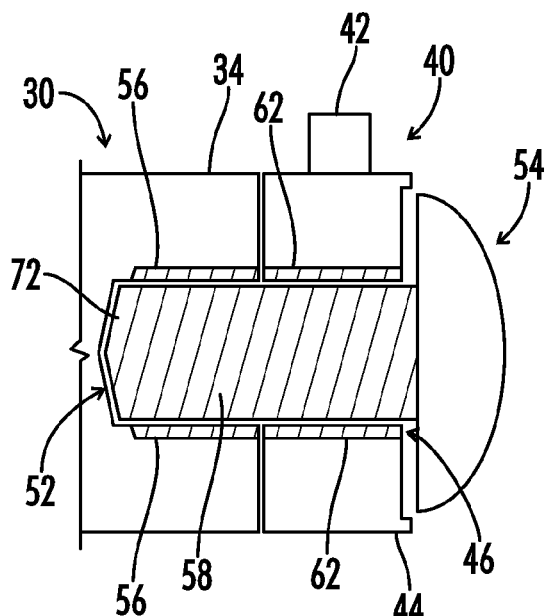
FIG. 3 illustrates a detail cross-sectional view of one embodiment of a locking member in accordance with the present invention.

Referring now to FIG. 3, in one embodiment, locking member 40 includes a collar 44 having an axial collar hole 46 defined therein. Collar 44 has a collar outer diameter substantially equal to the rod outer diameter in some embodiments. Second end 34 of retractable rod 30 defines an axial socket 52 substantially aligned with axial collar hole 46. A collar fastener 54 includes an extended region 72 inserted through axial collar hole 46 and engaging axial socket 52. In some embodiments, axial socket 52 includes an axial socket thread 56, and collar fastener 54 includes a fastener thread 58 threadedly engaging axial socket thread 56. In this embodiment, collar 44 includes an annular collar thread 62 engaging fastener thread 58. Collar 44 is angularly lockable in at least one angular direction, yet may rotate freely across a given angular range when rotated in the opposite angular direction. Depending on the axial lengths of extended region 72, collar 44 and axial socket 52, and also the pitch and size of fastener thread 58, collar 44 may rotate freely across an angular distance between about thirty and about three-hundred and sixty degrees. In yet another embodiment, collar 44 can rotate freely between about ninety and about one-hundred and eighty degrees. In yet other embodiments, collar 44 is angularly lockable in both angular directions, and can rotate freely across an angular distance of only about ninety degrees.

Figure 4:
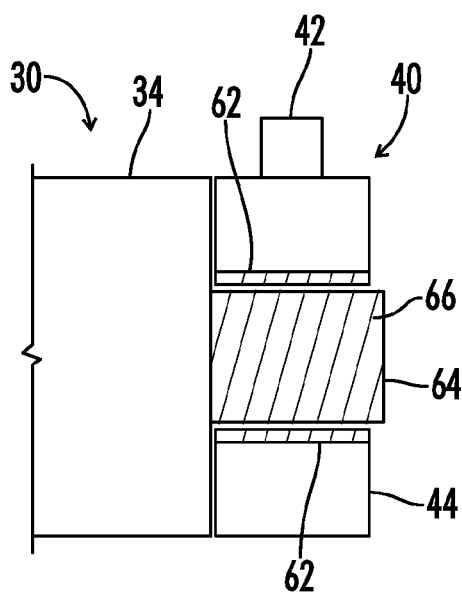
FIG. 4 illustrates a detail cross-sectional view of one embodiment of a locking member in accordance with the present invention.

Referring now to FIG. 4, in yet another embodiment, retractable rod 30 includes a collar mount 64 protruding from the second end 34 of rod 30. Collar mount 64 includes a collar mount thread 66 threadedly engaging collar thread 62. In this embodiment, collar 44 can be threaded onto collar mount 66. When collar 44 contacts second end 34 of rod 30, the collar 44 becomes angularly locked as it can advance no farther toward rod 30. Collar 44 can then be unlocked by reversing the direction of collar rotation and unscrewing collar 44 from collar mount 66.

Figure 5:
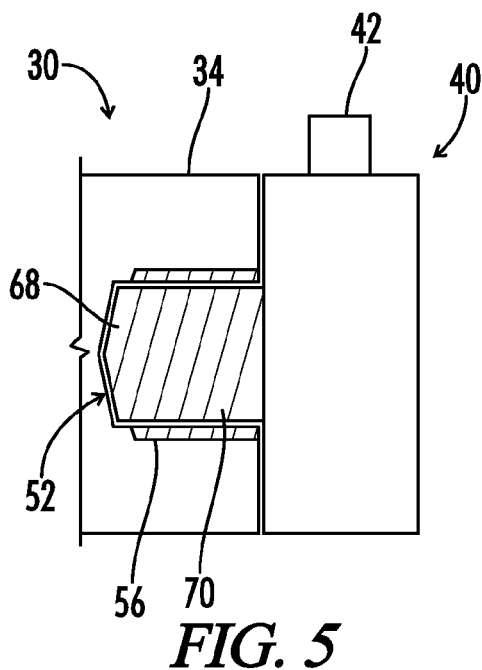
FIG. 5 illustrates a detail cross-sectional view of one embodiment of a locking member in accordance with the present invention.

Referring now to FIG. 5, in a further embodiment, second end 34 of retractable rod 30 defines an axial socket 52. Locking member 40 in this embodiment includes a cylindrical extension 68 protruding axially from locking member 40 toward rod 30 and engaging axial socket 52. Cylindrical extension 68 includes a cylindrical extension thread 70 engaging axial socket thread 56 for allowing locking member 40 to rotate freely in one angular direction while angularly locking when rotated in the opposite angular direction.

Cone Normal Mount

Figure 6:
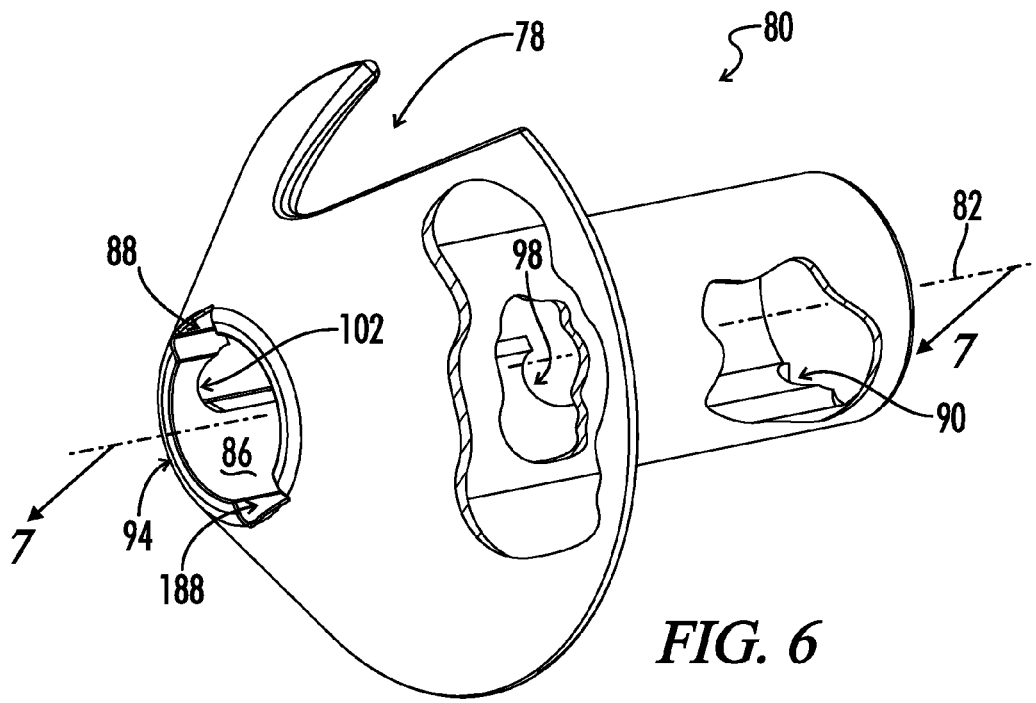
FIG. 6 illustrates a partially broken away view of one embodiment of a centering cone.
Figure 7:
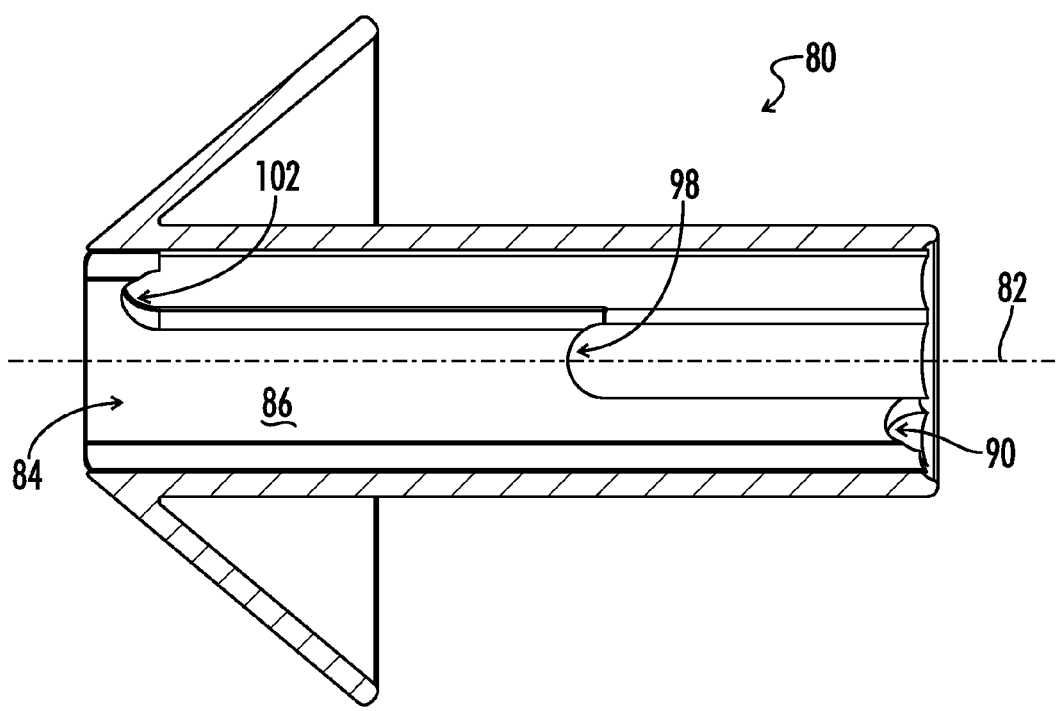
FIG. 7 illustrates a partial cross-sectional view of Section 7-7 from FIG. 6.

Referring now to FIG. 6 and FIG. 7, in some embodiments, a centering cone 80 is generally illustrated. Centering cone 80 is adapted to be positioned on retractable rod 30 for securing a wheel assembly to tire changing machine 10. Centering cone 80 includes a cone axis 82 and defines a hollow cavity 84 shaped for receiving retractable rod 30. Centering cone 80 includes an interior surface 86 substantially facing hollow cavity 84. Interior surface 86 defines a first longitudinal groove 88. In some embodiments, first longitudinal groove 88 is substantially parallel to cone axis 82 and extends through the entire length of cone 80. It is understood that in some embodiments first longitudinal groove 88 can be angled or curved relative to cone axis 82.

Figure 8:
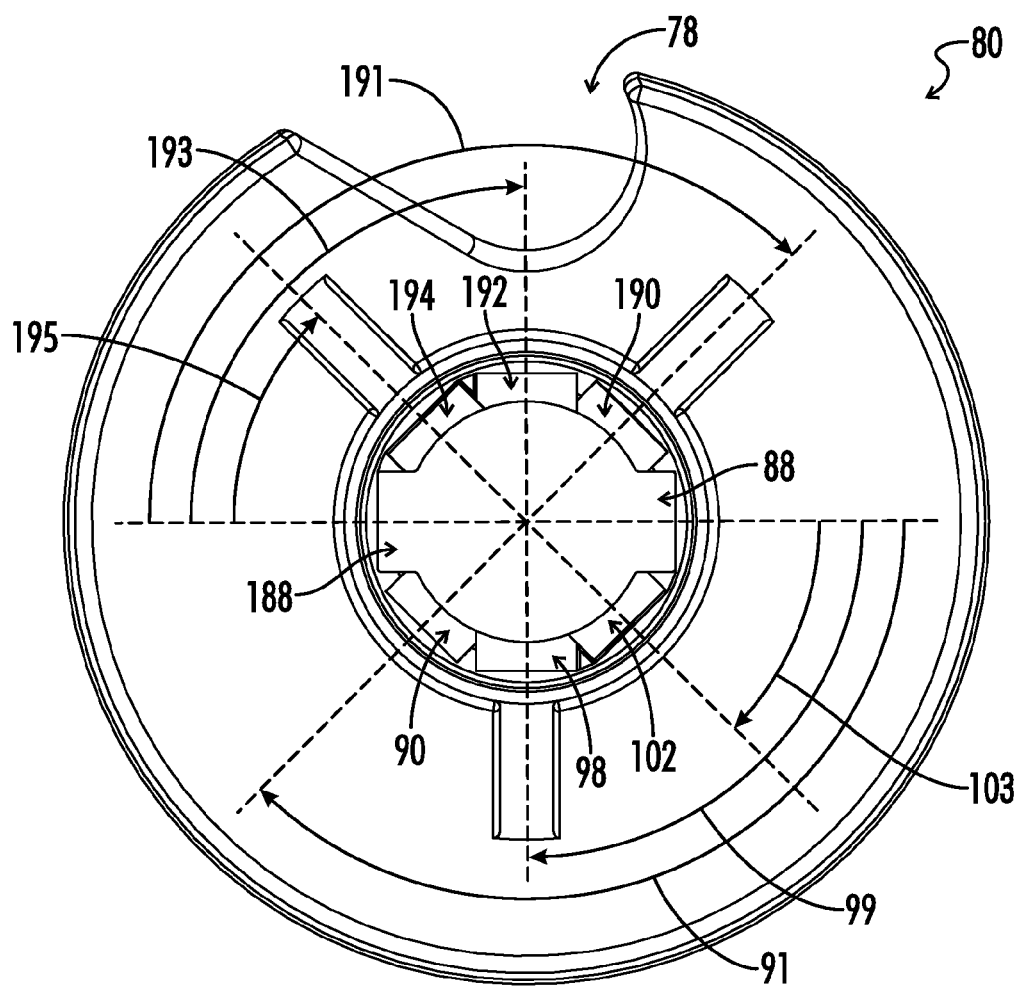
FIG. 8 illustrates an end view of one embodiment of a centering cone.

Referring further to FIG. 6, a first mounting socket 90 is defined in interior cone surface 86. First mounting socket 90 is generally shaped for receiving mounting stud 42. First mounting socket 90 in one embodiment is defined in the interior cone surface 86 on the end of centering cone 80 opposite rod opening 94. First mounting socket 90 is generally angularly offset from first longitudinal groove 88, as seen in FIG. 7 which generally illustrates a partial cross-sectional view of Section 7-7 from FIG. 6. Referring further to FIGS. 6-8, in some embodiments a second mounting socket 98 is defined on interior surface 86, and a third mounting socket 102 is also defined on interior surface 86. Each first, second and third mounting sockets 90, 98, 102 are angularly offset relative to each other and relative to first longitudinal groove 88, as seen in FIG. 8. For example, first mounting socket 90 is angularly offset from first longitudinal groove 88 by a first socket angle 91. Similarly, second mounting socket 98 is angularly offset from first longitudinal groove 88 by a second socket angle 99 less than first socket angle 91, and third mounting socket 102 is angularly offset from first longitudinal groove 88 by a third socket angle 103 less than second socket angle 99.

In some embodiments a second longitudinal groove 188 extends longitudinally through centering cone 80 opposite first longitudinal groove 88, as seen in FIG. 8. A fourth mounting socket 190, a fifth mounting socket 192, and a sixth mounting socket 194 are also defined in interior surface 86 in some embodiments. Each one of the fourth, fifth and sixth mounting sockets 190, 192, 194 are angularly offset and are positioned opposite first, second and third mounting sockets 90, 98, 102 respectively. Fourth mounting socket 190 is oriented at a fourth socket angle 191 relative to second longitudinal groove 188. Fifth mounting socket 192 is oriented at a fifth socket angle 193 relative to a second longitudinal groove 188. Sixth mounting socket 194 is oriented at a sixth socket angle 195 relative to second longitudinal groove 188. In one embodiment, each mounting socket is offset relative to an adjacent socket by about forty-five degrees.

Figure 9:
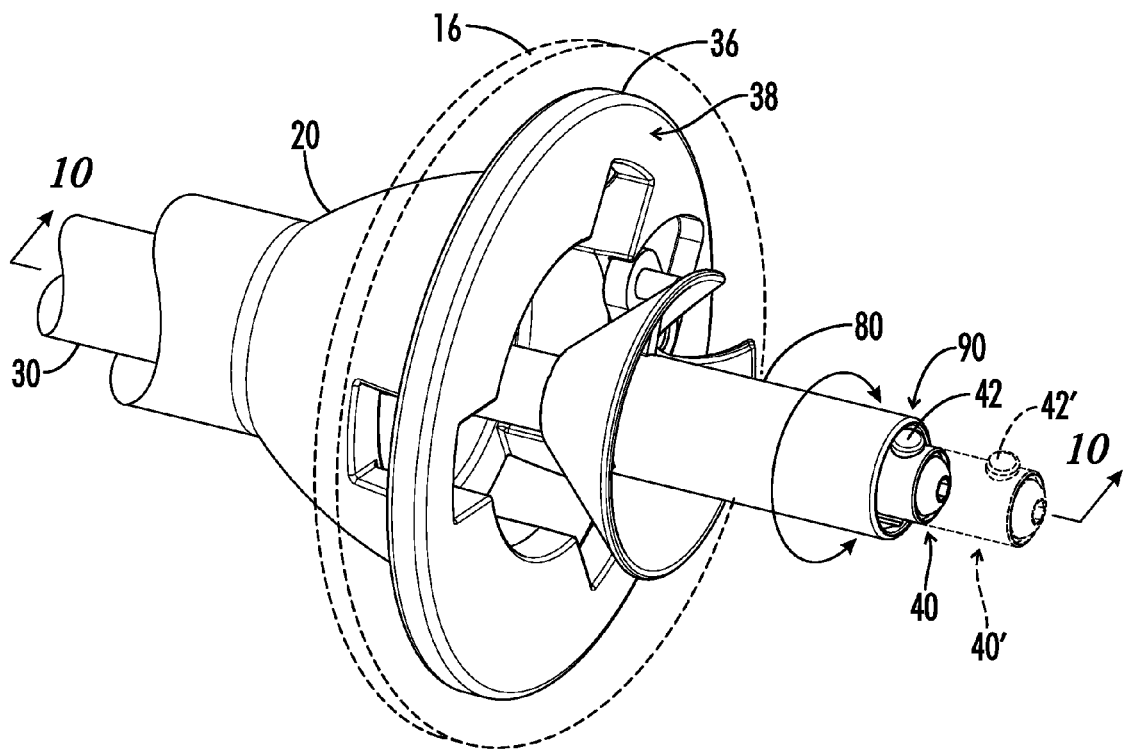
FIG. 9 illustrates a perspective view of one embodiment of a centering cone mounted on a retractable rod.

Referring now to FIGS. 6-9, during use, centering cone 80 is positioned on retractable rod 30 in one embodiment by slidably inserting rod opening 94 of centering cone 80 over retractable rod 30, also seen in FIG. 2. As previously noted, locking member 40 is angularly lockable in only one angular direction in some embodiments. As such, mounting stud 42, which extends from locking member 40, can be secured at a fixed angular position. To install cone 80 on rod 30, first longitudinal groove 88 is aligned with mounting stud 42 and centering cone 80 is slid longitudinally over retractable rod 30 such that a distal region of retractable rod 30 extends from the outer end of centering cone 80. In this position, the locking member has an initial position 40' and the mounting stud an initial position 42' as seen in FIG. 9. When positioned on retractable rod 30, centering cone 80 can be angularly rotated relative to both retractable rod 30 and mounting stud 42 because locking member 40 is generally angularly locked relative to retractable rod 30. When centering cone 80 is rotated the same angular distance as the first angular offset between first longitudinal groove 88 and first mounting socket 90, or first socket angle 91, mounting stud 42 becomes angularly aligned with first mounting socket 90.

Figure 10:
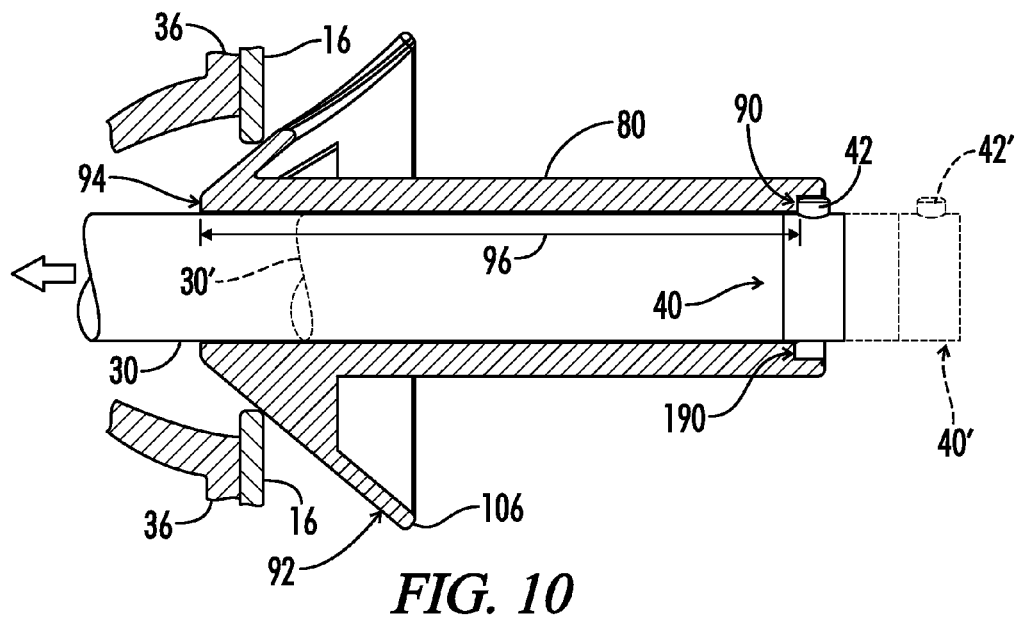
FIG. 10 illustrates a partial cross-sectional view of one embodiment of Section 10-10 from FIG. 9.

From this position, as seen in FIG. 10, retractable rod 30 can be retracted from initial rod position 30'. When retractable rod 30 is retracted relative to rotatable shaft 20, locking member 40 and mounting stud 42 are longitudinally translated from initial locking member position 40' and initial mounting stud position 42' toward centering cone 80, causing mounting stud 42 to engage first mounting socket 90, thereby clamping wheel rim 16 between centering cone 80 and engagement plate 36. Engagement plate 36 extends generally from shaft 20. In this position, seen in FIG. 9 and FIG. 10, wheel rim 16 is securely mounted on tire changing machine 10 and can be rotated for wheel servicing operations. In this position, mounting stud 42 is positioned a first longitudinal distance 96 from rod opening 94.

Figure 11:
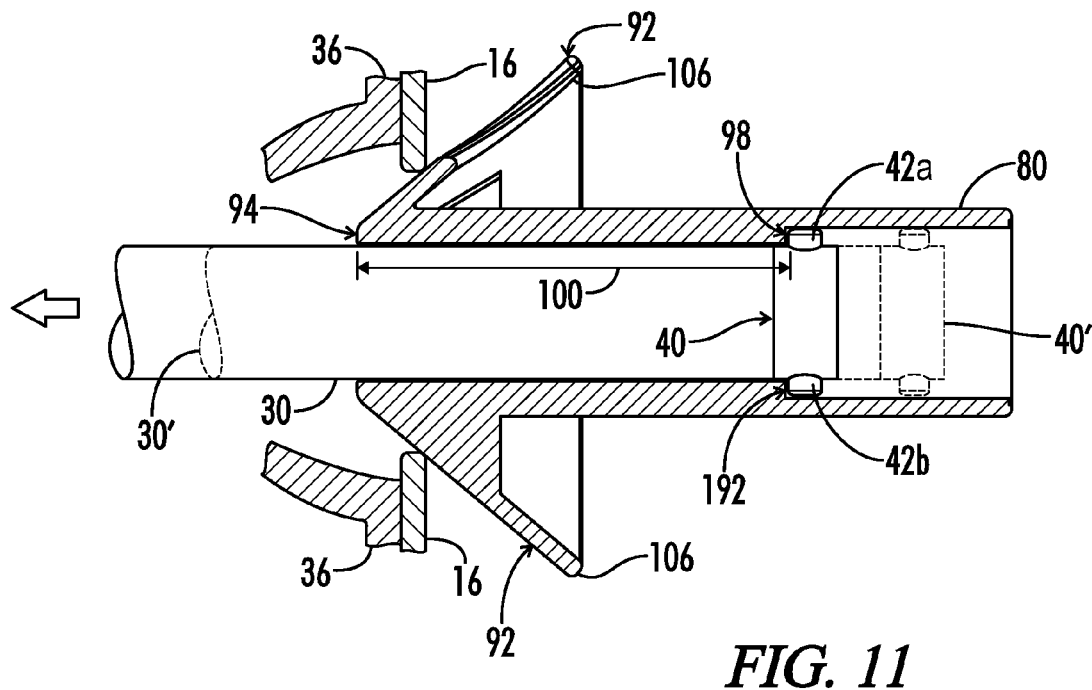
FIG. 11 illustrates a partial cross-sectional view of one embodiment of a centering cone clamping configuration.

Referring to FIG. 11, a cone 80 can be positioned such that mounting stud 42 is angularly aligned with second mounting socket 98. From this position, retractable rod 30 can be retracted from an initial position 30' causing locking member 40 to move from its initial locking member position 40' toward cone 80 and allowing mounting stud 42 to engage second mounting socket 98.

In some embodiments, locking member 40 includes first and second mounting studs 42a, 42b protruding radially from opposite sides of locking member 40. First mounting stud 42a engages one of first, second and third mounting sockets 90, 98, 102; and second mounting stud 42b engages one of third, fourth and fifth mounting sockets 190, 192, 194. First and second mounting studs 42a, 42b can provide a more uniform force distribution between cone 80 and wheel 16 as opposed to some other configurations. When one or more mounting studs 42 engage second and/or fifth mounting sockets 98, 192 as seen in FIG. 11, a second longitudinal distance is defined between rod opening 94 and mounting studs 42a, 42b.

Figure 12:
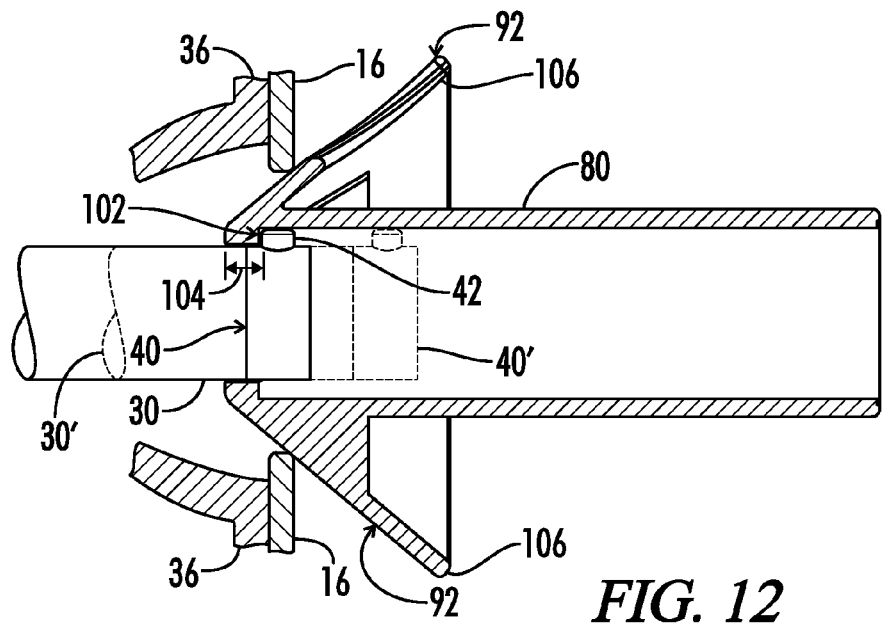
FIG. 12 illustrates a partial cross-sectional view of one embodiment of a centering cone clamping configuration.

As seen in FIG. 12, in some embodiments, the mounting stud 42 can engage mounting sockets at different axial positions in the hollow cavity of the cone 80. By providing multiple axial socket positions for engagement by the mounting stud 42 or first and second mounting studs 42a, 42b, wheels of different thicknesses can be accommodated using one cone 80. For example, a wheel having a thicker rim could be accommodated by engaging third mounting socket 102 with mounting stud 42, as seen in FIG. 12. In contrast, a wheel with a thinner rim could be accommodated by engaging the first mounting socket 90 with mounting stud 42 using the same cone 80, as seen in FIG. 10. When one or more mounting studs 42 engage third and/or sixth mounting sockets as seen in FIG. 12, a third longitudinal distance 104 is defined between rod opening 94 and mounting stud 42.

Referring again to FIG. 2, in some embodiments an engagement lug 74 protrudes from engagement surface 38 for engaging a lug hole on wheel rim 16 when clamped between centering cone 80 and engagement plate 36, as seen in FIG. 8 and FIG. 9. Engagement lug 74 can also engage a wheel clamp or other structure positioned on rod 30 or shaft 20. Engagement lug 74 extends axially from a pivoting support pivotally mounted in a recess on the engagement plate 36. Engagement lug 74 generally extends beyond the engagement surface 38. In some embodiments, a torsion or compression spring may be disposed between engagement plate 36 and the pivoting support to bias the engagement lug relative to the rotatable shaft, as seen in FIG. 2. Referring again to FIG. 8, in some embodiments the cone 80 includes a cone recess 78 on the cone flange 106 for disengaging the cone from a wheel rim.

Clamp Normal Mount

The centering cone clamping configuration described above and illustrated in one embodiment in FIG. 9 clamps the wheel rim 16 between the engagement plate 36 and the outer cone surface 92. In some applications, it may be desirable to mount the wheel rim in a clamping configuration so that a cosmetic surface of wheel rim 16 does not directly contact the cone 80. This objective is achieved in some embodiments using a wheel holding assembly including a wheel clamp 120 disposed on the retractable rod 30, as illustrated in FIG. 13 and FIG. 14.

Figure 13:
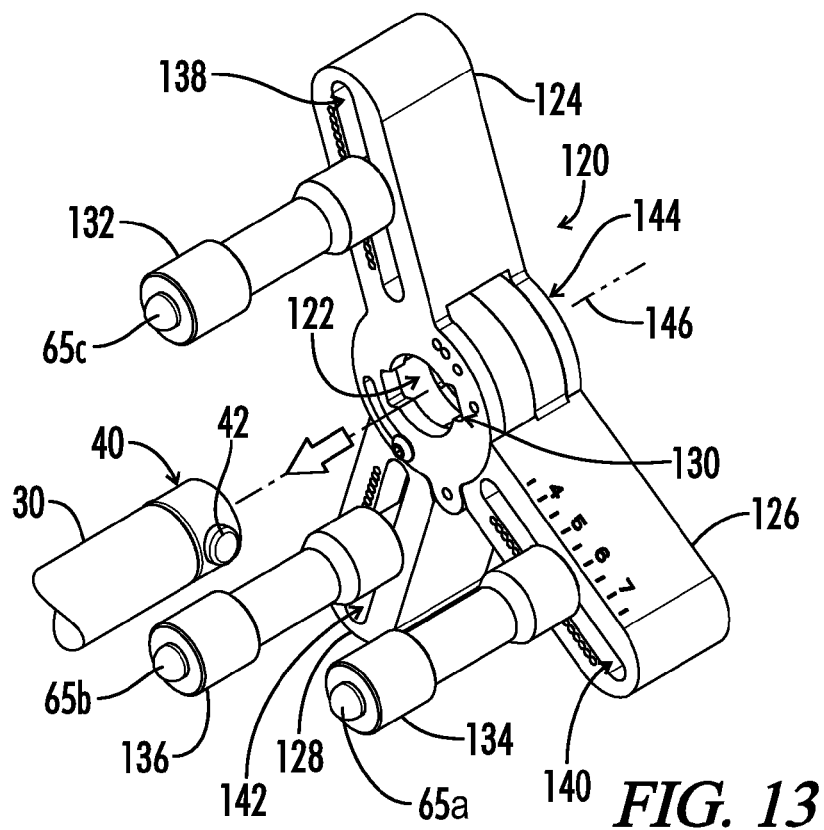
FIG. 13 illustrates a partial perspective view of one embodiment of a wheel clamp.

Referring now to FIG. 13, a wheel clamp 120 in one embodiment includes a clamp aperture 122 shaped for receiving locking member 40 and retractable rod 30. Locking member 40 includes at least one mounting stud 42 protruding radially therefrom, and wheel clamp 120 includes an aperture groove 130 shaped for receiving mounting stud 42 in a clearance fit. The wheel clamp 120 includes a hub 144 from which one or more clamp arms 124, 126, 128 radially extend. The hub 144 has a central axis 146 generally aligned with the axis of rotation of the rotatable shaft when installed on rod 30. In one embodiment, each clamp arm 124, 126, 128 includes a pin 132, 134, 136 respectively, protruding axially therefrom. In one embodiment, each pin is radially adjustable relative to the hub 144 and can be configured to fit various lug hole patterns on a wheel rim.

Figure 14:
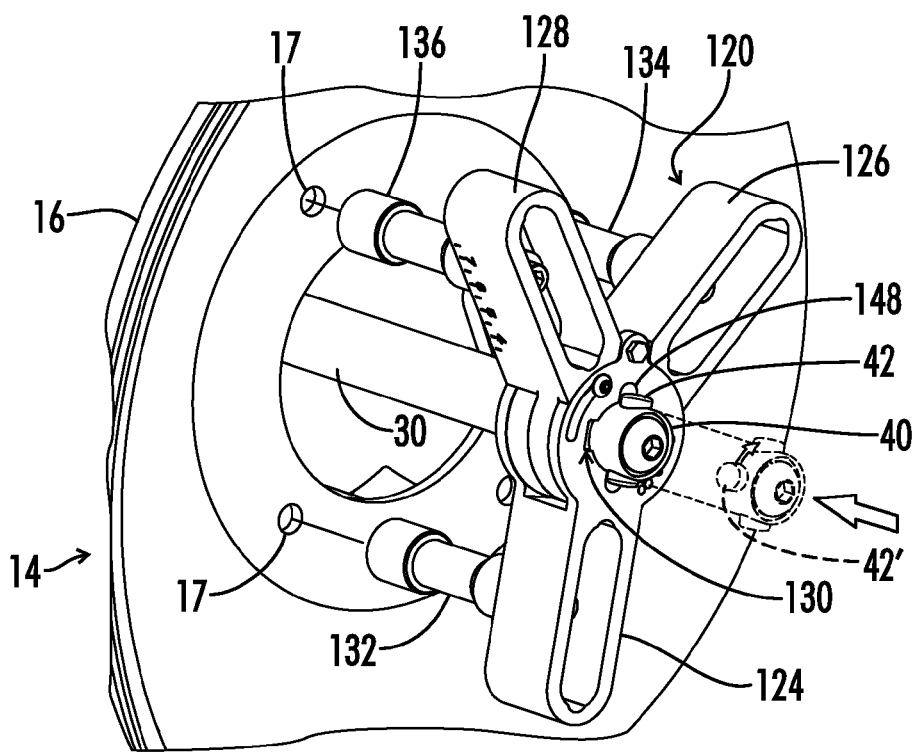
FIG. 14 illustrates a partial perspective view of one embodiment of a wheel clamp.

Referring now to FIG. 14, one embodiment of a wheel clamp 120 is shown being used to secure a wheel assembly 14 to a retractable rod 30 of a tire changing machine. A wheel assembly 14 is positioned on the rotatable shaft 20 such that the wheel rim engages the rotatable shaft 20 or the engagement plate 36, and retractable rod 30 protrudes through a center rim hole in the wheel rim. The wheel assembly is generally configured in this embodiment with the cosmetic surface of wheel rim 16 facing away from the wheel servicing machine. Wheel clamp 120 is then positioned on retractable rod 30 such that locking member 40 extends through clamp aperture 122 and so that first, second and third pins 132, 134, 136 project toward wheel rim 16 and engage corresponding lug holes 17 on wheel rim 16, as seen in FIG. 14.

Upon positioning of wheel clamp 120 on retractable rod 30, mounting stud 42 generally passes through aperture groove 130 beyond wheel clamp 120 to an initial mounting stud position 42'. Locking member 40 is then rotated so that mounting stud 42 moves from initial angular mounting stud position 42' to an angular mounting stud position substantially aligned with notch, or recessed portion 148. In some embodiments, notch 148 is angularly offset from aperture groove 130 on wheel clamp 120 by a notch offset angle. In one embodiment, the notch offset angle is about ninety degrees, so that the locking member 40 is rotated by about ninety degrees for alignment of the mounting stud 42 with the notch 148.

From the position where notch 148 is angularly aligned with mounting stud 42, retractable rod 30 can be retracted relative to rotatable shaft 20 toward the wheel servicing machine, causing mounting stud 42 to approach and engage notch 148. Retraction of rod 30 pulls clamp 120 toward wheel rim 16, allowing each one of the axial pins 132, 134, 136 to engage a corresponding lug hole 17 on wheel rim 16 and causing wheel rim 16 to be securely clamped in place between wheel clamp 120 and the rotatable shaft 20. In particular, in some embodiments wheel rim 16 is clamped between the engagement plate 36 and wheel clamp 120 so that a cosmetic surface of wheel rim 16 facing wheel clamp 120 does not contact any clamp arms. As such, wheel clamp 120 provides a secure attachment for wheel rim 16 to shaft 20 without damaging the cosmetic rim surface. This configuration, generally illustrated in FIG. 14, can be referred to as a standard, or normal, mount using wheel clamp 120 wherein the cosmetic surface faces away from the wheel servicing machine.

Reverse Mount

Figure 15:
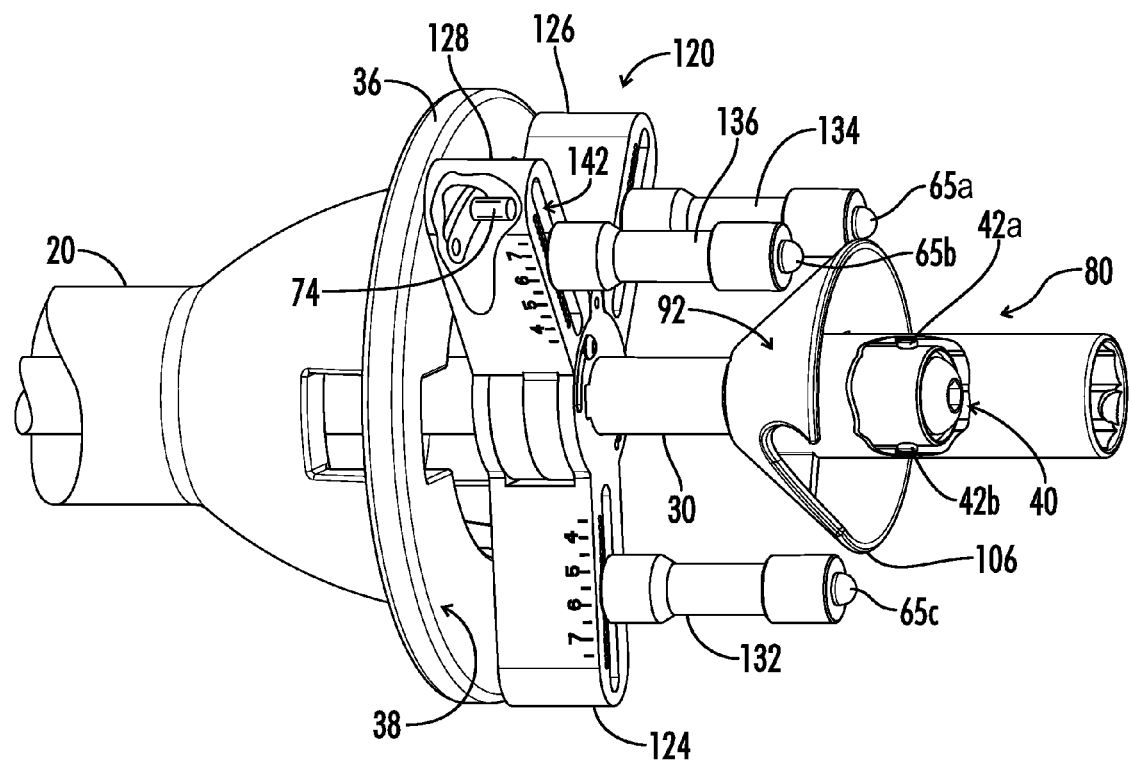
FIG. 15 illustrates a partially broken-away view of one embodiment of a reverse mount wheel clamping configuration.

In some embodiments, a wheel assembly can be mounted to a wheel servicing machine in accordance with the present invention in a reverse mount configuration, wherein the cosmetic surface of the wheel rim faces toward the wheel servicing machine, as generally illustrated in FIG. 15. One embodiment of a reverse mount configuration is illustrated wherein a wheel clamp 120 is generally positioned with retractable rod 30 extending through the clamp aperture and the first, second and third pins 132, 134, 136 projecting away from rotatable shaft 20. Centering cone 80 is positioned on retractable rod 30, and a wheel rim can be clamped between the pins and cone surface 92 of centering cone 80. In this configuration, the cosmetic surface of the wheel rim generally faces the wheel clamp 120.

Some conventional wheel servicing machines provide a lug on the rotatable shaft that engages a lug hole on a wheel for transferring torque from the shaft to the wheel. The conventional configuration can cause damage to a cosmetic surface when the lug on the shaft engages the lug hole on the cosmetic side of the wheel. In one embodiment, the present invention provides a reverse mount configuration, as seen in FIG. 15, wherein the clamp 120 is supported axially by engagement surface 38 on engagement plate 36. In this embodiment, the lug 74 on engagement plate 36 engages a radial slot in one of the arms 124, 126, 128 for transferring torque between the shaft and the wheel clamp 120, and eventually to the wheel rim 16. For example, in FIG. 15, lug 74 engages radial slot 142. The reverse mount configuration prevents direct contact between the wheel rim surface and the rotatable shaft 20 by using the pins 132, 134, 136 to stand the wheel clamp 120 off the rim surface. In some embodiments, centering tips 65a, 65b and 65c protrude generally from pins 132, 134, 136 and engage corresponding lug bolt holes on the rim surface of the rim to further prevent damage to the rim surface.

Platform Assembly

Figure 16:
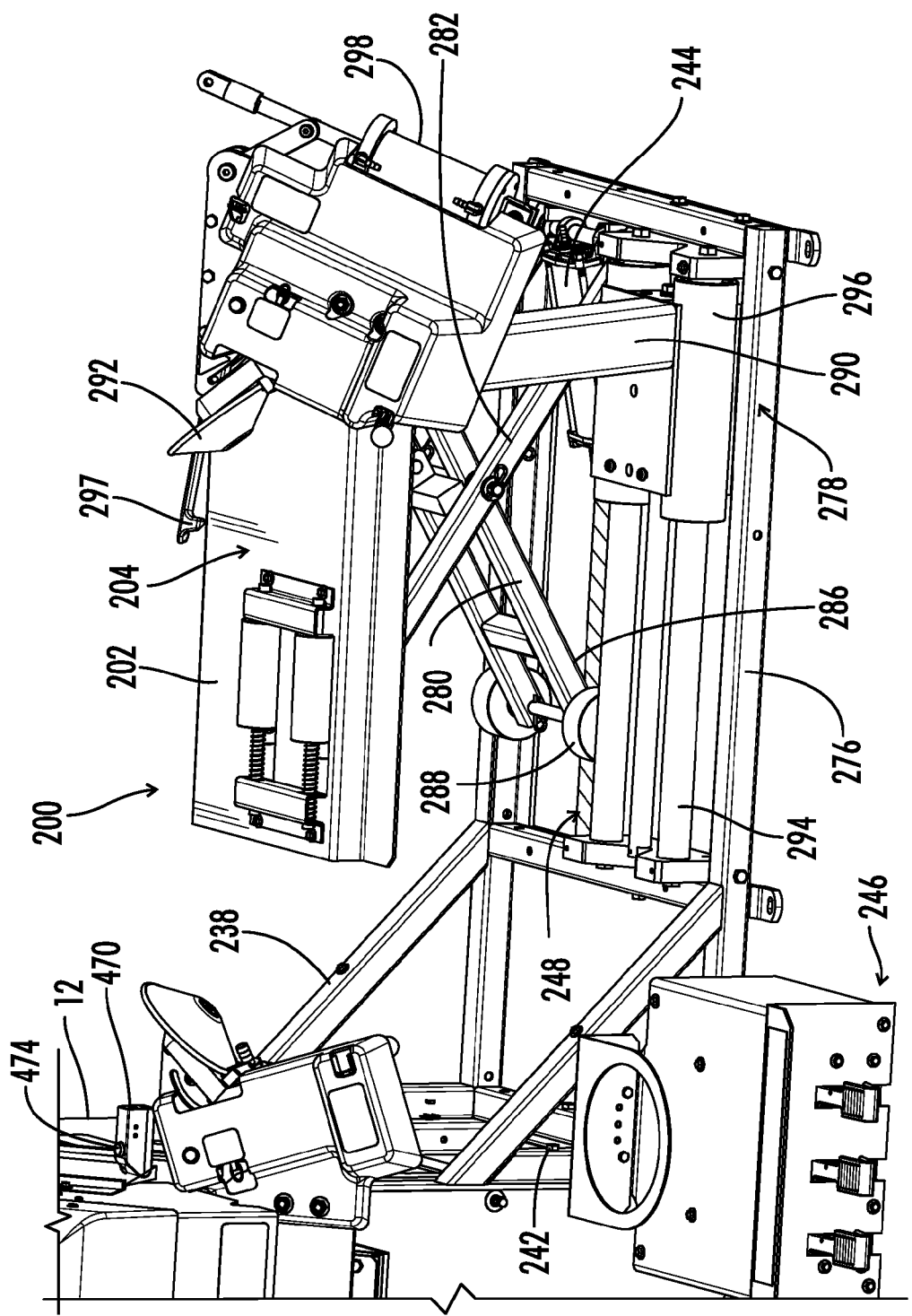
FIG. 16 illustrates a perspective view of one embodiment of a platform assembly in a partially elevated position.

Referring now to FIG. 16, yet another embodiment of the present invention provides a platform apparatus, or wheel lift assembly 200, for supporting a wheel assembly on a wheel servicing machine 10. Prior to wheel servicing operations, a user typically must secure the wheel assembly to the rotatable shaft 20. In some embodiments, the wheel assembly may be too large or too heavy for an individual operator to lift the wheel assembly to the necessary elevation for positioning onto the shaft. Also, after the wheel is positioned on the shaft or rod, the lug holes on the wheel rim may not be properly angularly aligned with the corresponding lug engaging structures on the tire changing machine, forcing the operator to manually reposition the wheel relative to the shaft.

Figure 17:
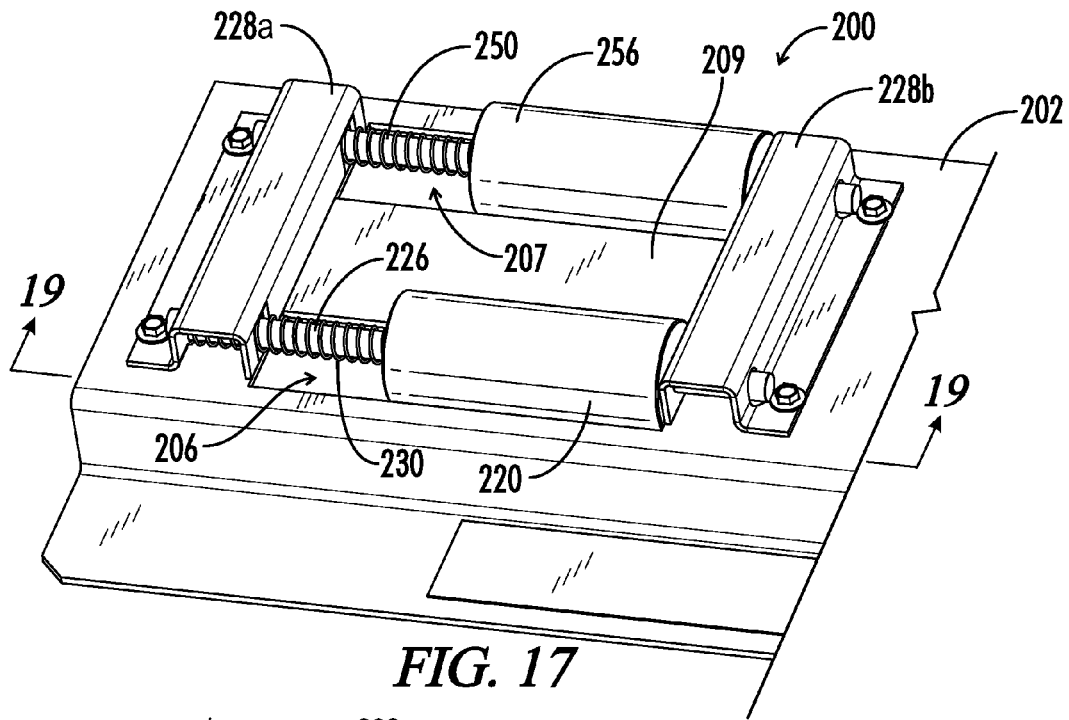
FIG. 17 illustrates a detail perspective view of one embodiment of platform roller.

Platform apparatus 200 includes a vertically moveable platform 202 having a platform surface 204. As seen in FIG. 17, platform surface 204 defines a first longitudinal slot 206. A first roller axle 226 longitudinally spans the first longitudinal slot 206. A first roller 220 is disposed on the first roller axle 226. First roller 220 is in some embodiments rotatable relative to first roller axle 226 so that a wheel assembly or tire, when positioned on platform apparatus 200, rollingly engages first roller 220, thereby allowing the wheel assembly 14 to be angularly rotated while resting on platform apparatus 200. It will be appreciated that in some embodiments, first roller axle 226 is also rotatable relative to platform 202. First roller 220 in some embodiments embodies the shape of an elongated cylinder. First roller axle 226 generally spans first longitudinal slot 206 and is secured to platform 202 by one or more axle brackets, 228a, 228b, seen in FIG. 17. In some embodiments, first and second axle brackets 228a, 228b can be integrally formed on platform 202 by cutting and bending platform material away from first longitudinal slot 206. In other embodiments, first and second axle brackets 228a, 228b are independently secured to platform 202 by one or more axle bracket fasteners.

A first spring 230 is disposed around first roller axle 226. First spring 230 in some embodiments is a compression coil spring. It will be appreciated by those of skill in the art that, in other embodiments, first spring 230 may be a tension coil spring disposed around first roller axle 226. First roller 220 includes a first roller end 222 and a second roller end 224, seen in FIG. 19. First axle 226 includes a first axle end 214 and a second axle end 216. First coil spring 230 is disposed around the first roller axle 226 between first roller end 222 and first axle end 214. When a tire or a wheel assembly is positioned on platform assembly 200 such that the tire or wheel assembly engages first roller 220, first coil spring 230 provides a resilient spring force acting against movement of first roller 220, allowing the tire or wheel assembly to be resiliently positioned relative to the shaft.

Figure 18A:
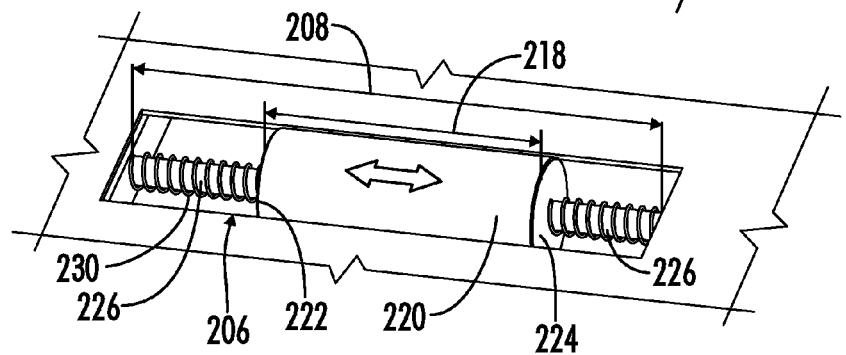
FIG. 18A illustrates a detail perspective view of one embodiment of a platform roller.
Figure 18B:
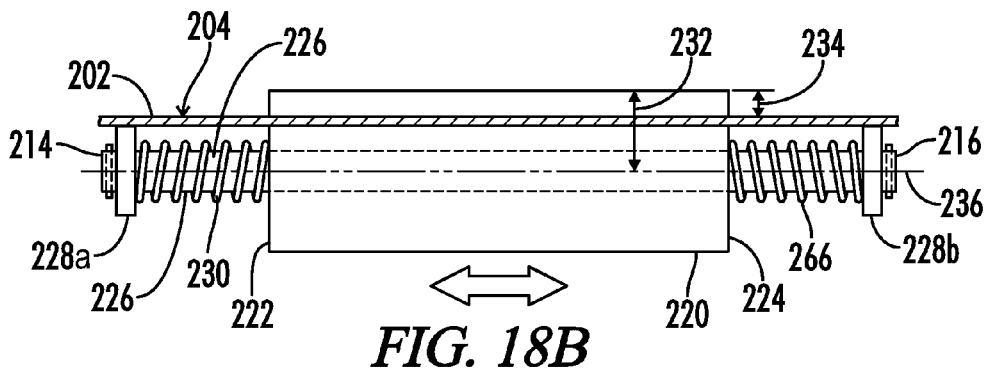
FIG. 18B illustrates a partial cross-sectional view showing Section 18B-18B from FIG. 18A.

Referring now to FIGS. 18A and 18B, another embodiment of a roller assembly is generally illustrated. First longitudinal slot 206 includes a first slot length 208, and first roller 220 includes a first roller length 218 between first and second first roller ends 222, 224. In some embodiments, first roller length 218 is less than first slot length 208. It is further understood that, in additional embodiments not shown, first roller length 218 can be substantially equal to first slot length 208 provided first roller 220 is free to rotate in first longitudinal slot 206. Referring further to FIG. 18B, first roller 220 generally extends a first roller height 234 above platform surface 204. In one embodiment, first roller 220 includes a first roller axis of rotation 236 positioned below platform 202. As such, first roller height 234 is less than first roller radius 232. In this embodiment, first and second axle brackets 228a, 228b extend generally downward from platform 202.

Referring again to FIG. 19, in yet another embodiment, first and second axle brackets 228a, 228b extend upward from platform 202. First roller axle 226 and first roller axis of rotation 236 are generally positioned above platform 202. In this embodiment, first roller height 234 is greater than first roller radius 232. It is understood that in other embodiments first roller axis of rotation 236 is substantially aligned with platform 202, and first roller height 234 is substantially equal to first roller radius 232.

Figure 19:
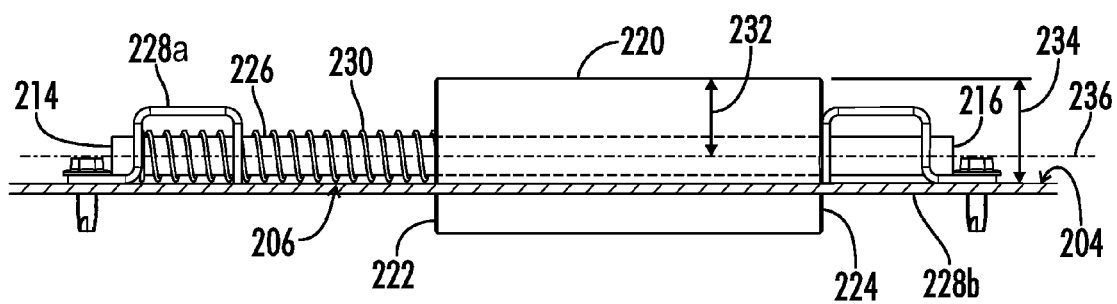
FIG. 19 illustrates a partial cross-sectional view showing Section 19-19 from FIG. 17.
Figure 20:
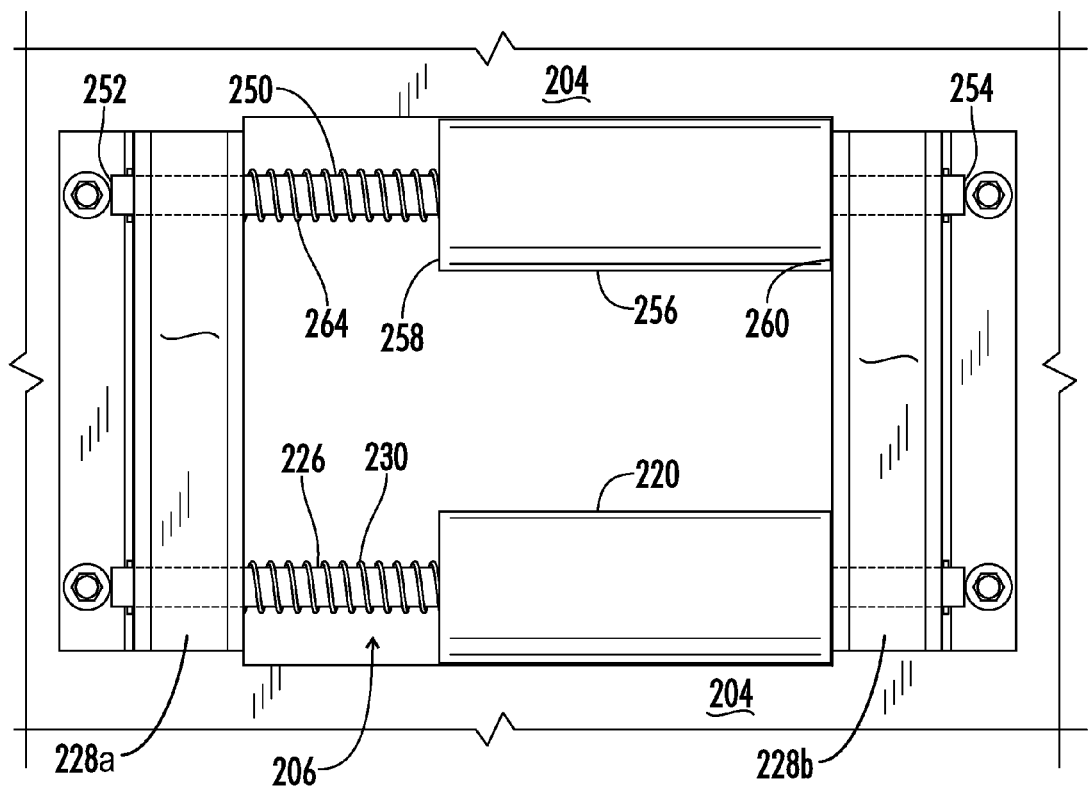
FIG. 20 illustrates a top view of one embodiment of a platform roller assembly.

In the embodiment seen in FIG. 19, only one spring 230 is disposed on first roller axle 226, biasing first roller 220 toward one end of first longitudinal slot 206. In one embodiment, first spring 230 is positioned between first roller 220 and the tire changing machine so that first roller 202 is biased away from tire changing machine. Such placement of first coil spring 230 generally allows first roller 220, when engaged by a tire or wheel assembly, to be longitudinally pushed toward the shaft for proper wheel assembly positioning Referring to FIG. 20, in additional embodiments, a second roller axle 250 longitudinally spans first longitudinal slot 206. A second roller 256 is disposed on second roller axle 250. Second roller 256 can be rotatably disposed on second roller axle 250. In other embodiments, second roller 256 can be fixed to second roller axle 250. The second roller axle 250 has third and fourth axle ends 252, 254. In one embodiment, third axle end 252 is attached to first axle bracket 228a, and fourth axle end 254 is attached to second axle bracket 228b. A second spring 264 is disposed around second roller axle 250 between third roller end 258 and third axle end 252. In one embodiment, second spring 264 engages first axle bracket 228a at one spring end and engages second roller 256 at the opposite spring end. It is understood that, in some embodiments, second spring 264 may be a compression coil spring. It is appreciated that in other embodiments, second coil spring 264 may be a tension coil spring. As illustrated generally in FIG. 20, in one embodiment, first and second rollers 220, 256 each have a roller length less than the length of the first longitudinal slot 206.

Referring again to FIGS. 18A and 18B, in some embodiments, a third spring 266 is disposed around first roller axle 226 between second roller end 224 and second bracket 228b. In some embodiments, first and third springs 230, 264 have different spring constants and/or different lengths. In yet other embodiments, first and third springs 230, 264 have substantially the same spring constant. Third spring 230 in some embodiments may be a compression coil spring. In other embodiments, third spring 230 may be a tension coil spring. Referring again to FIG. 17, in some embodiments, platform surface 204 defines a second longitudinal slot, and second roller axle 250 longitudinally spans the second longitudinal slot. In this embodiment, a center panel 209 of platform 202 separates first and second longitudinal slots and first and second rollers. The center panel 209 can prevent debris from falling between first and second rollers.

Figure 22:
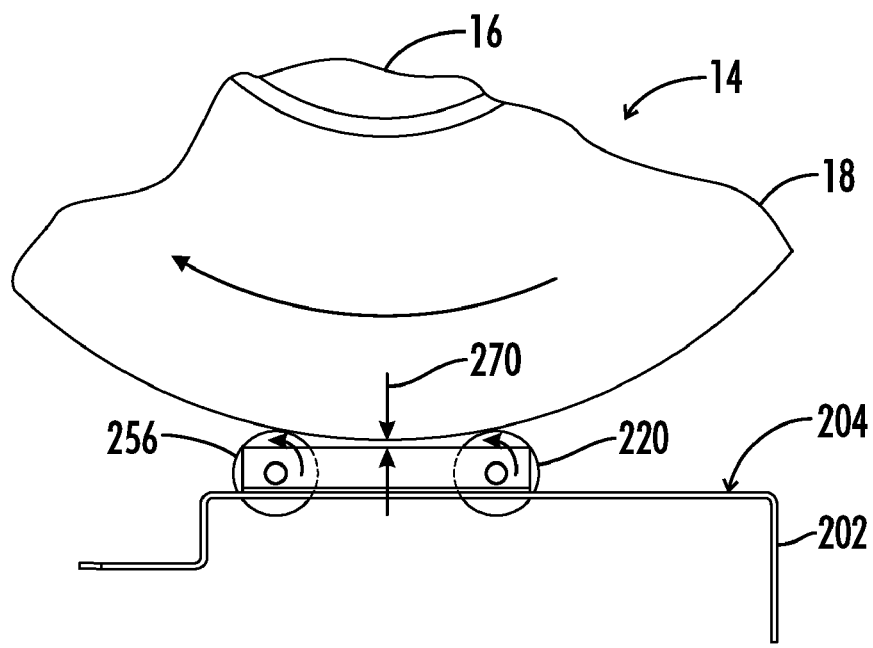
FIG. 22 illustrates a partial cross-sectional view of one embodiment of a platform roller assembly.

In some embodiments, as seen in FIG. 22, a clearance gap 270 is defined between tire 18 and platform surface 204 of platform 202 when wheel assembly 14 is positioned on first and second rollers 220, 256. Clearance gap 270 allows first and second rollers 220, 256 to freely rotate without tire 18 interfering with platform surface 204.

Figure 21:
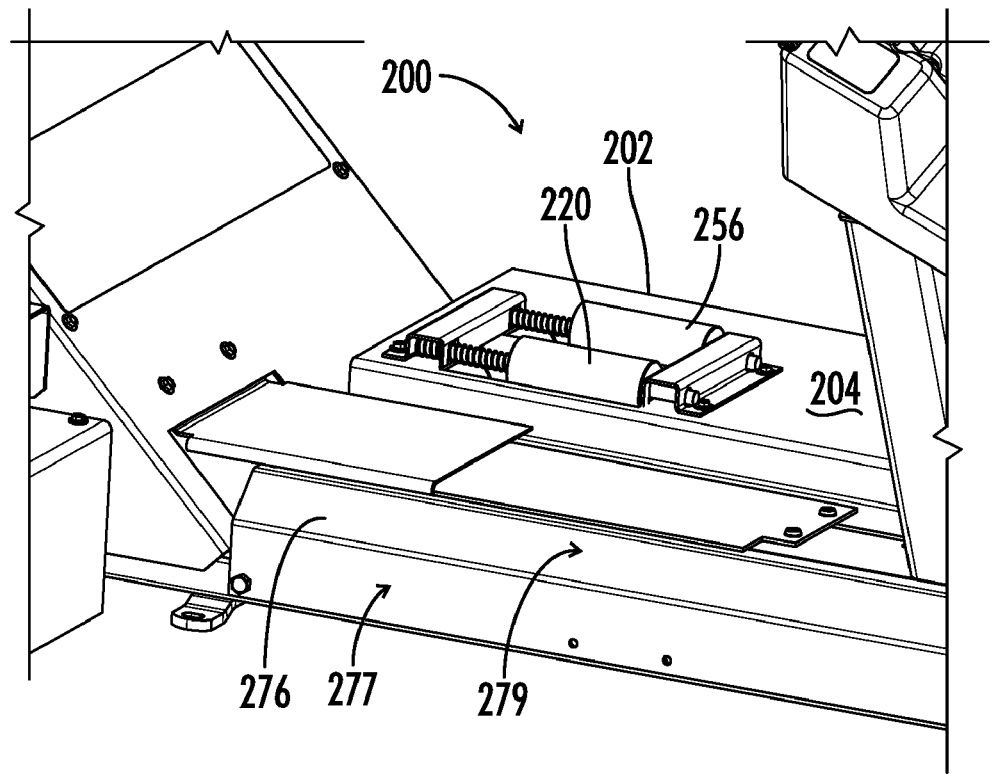
FIG. 21 illustrates a partial perspective view of one embodiment of a platform roller assembly in a lowered position.

Referring now to FIG. 21, platform assembly 200 includes an inclined ramp 276 located on a longitudinal edge of platform assembly 200. Inclined ramp 276 in some embodiments includes a vertical surface 277 and an inclined surface 279. Inclined surface 279 provides an angled surface for rolling a wheel assembly or tire onto or off of first and/or second rollers 220, 256. Inclined surface 279 is generally oriented at a ramp angle relative to the platform surface. In some embodiments the ramp angle may be between about twenty and about seventy degrees. In other embodiments, the ramp angle may be around forty-five degrees.

Referring again to FIG. 16, in one embodiment, platform 202 is attached to a modular platform frame 238. Frame 238 includes an attachment portion for attachment to base 12 by one or more frame fasteners 242. The modular frame configuration allows frame 238 and base 12 to be disassembled for packaging and/or shipping. For example, base 12 and frame 238 having platform apparatus 200 mounted thereon can be shipped and/or packaged separately, and frame 238 can be attached to base 12 on-site at the final use destination.

In one embodiment, wheel lift apparatus 200 includes a first leg 280 having a first leg distal end 286. A leg wheel 288 is pivotally disposed on first leg distal end 286. Leg wheel 288 rollingly engages integral roller surface 248 as platform 202 is raised or lowered. Integral roller surface 248 is defined on platform apparatus 200 so that leg wheel 288 does not engage the ground. A second leg 282 is pivotally attached to first leg 280. In some embodiments a powered platform cylinder, or pneumatic platform actuator 244, is operatively attached to one or both legs 280, 282 and is operative for raising and lowering platform 202. In some embodiments, a pedal foot control 246 is disposed on platform frame 238, and pedal foot control 246 is operatively connected to powered platform cylinder 244. In some embodiments, pedal foot control 246 is connected to a pressure source coupled to powered platform cylinder 244.

Referring again to FIG. 16, in some embodiments, frame 238 includes a platform track 294 oriented in a longitudinal direction. Platform track 294 in some embodiments includes one or more longitudinal rods. A platform carriage 296 is slidably disposed on platform track 294. Platform carriage 296 in some embodiments includes a platform tool arm 290 extending from platform carriage 296 in a generally transverse direction relative to the platform track 294. A platform tool 292 is attached to the platform tool arm 290. In some embodiments, the platform tool 292 may include a second tire roller tool, or a bead compression, i.e. bead-loosening, tool. In other embodiments, platform tool 292 can include a contact block or tire mounting or dismounting tool. In yet further embodiments, the platform tool 292 is a dismounting tool, or bead hook 297, also seen in FIG. 16, operative for engaging a bead on a tire in axial tension or axial compression. It is understood that more than one tool can be attached to platform tool arm 290. As seen in FIG. 16, in some embodiments, a platform tool powered cylinder 298 is attached to the platform tool arm 290. The platform tool powered cylinder 298 is attached to platform tool arm 290 and is operatively connected to the platform tool 292 for actuating the platform tool 292, i.e. for advancing or retracting the platform tool 292. In some embodiments, the platform tool powered cylinder 298 is a pneumatic cylinder, or a pneumatic linear actuator, operatively connected to an operator control also positioned on the platform tool arm.

Tool Assembly

Referring again to FIG. 1, another embodiment of the present invention provides a wheel servicing machine 10 having a first tool assembly 300 extending from base 12 substantially parallel to rotatable shaft 20. A second tool assembly 350 extends from platform apparatus 200 which is connected to base 12. In some other embodiments, second tool assembly 350 extends directly from base 12 by a platform tool arm 290 without any platform apparatus 200 present, wherein both the first and second tool assemblies 300, 350 are longitudinally moveable relative to base 12.

Figure 23:
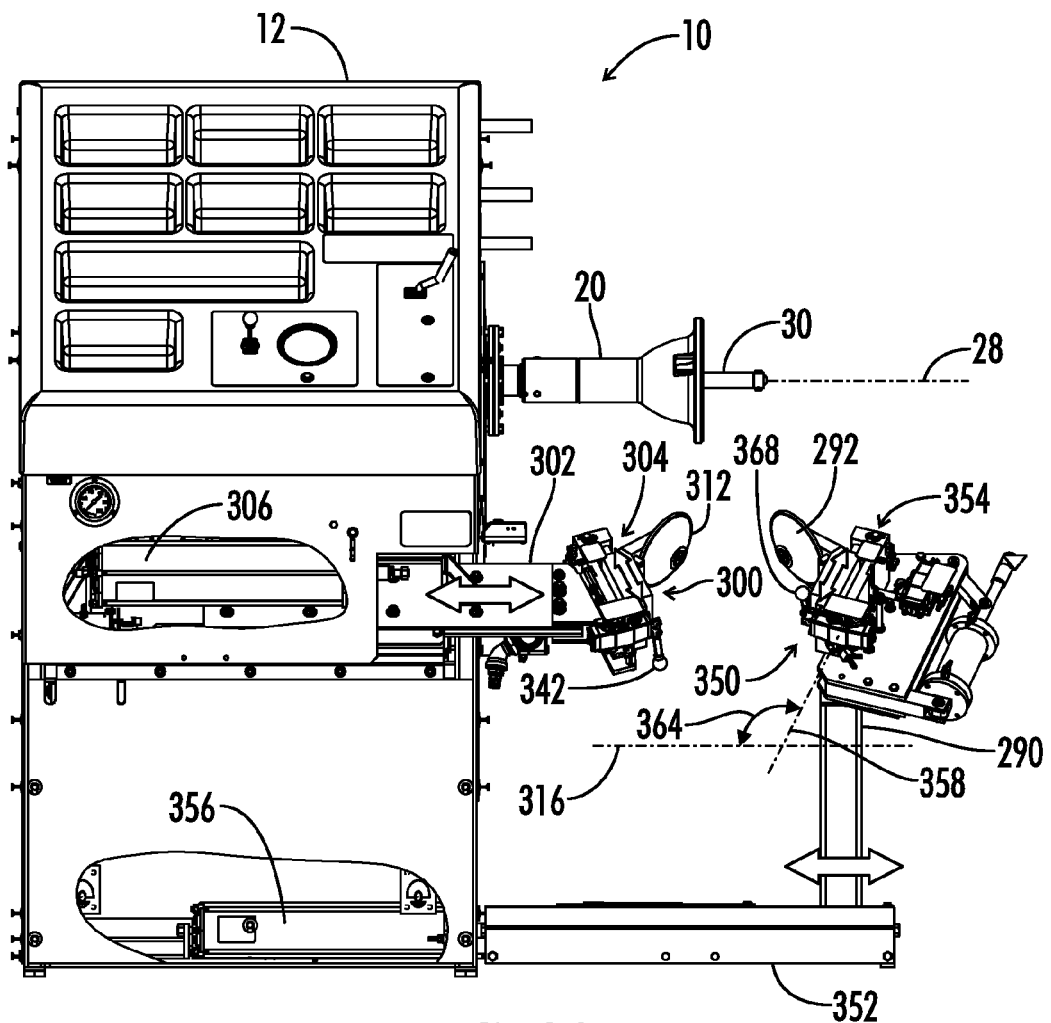
FIG. 23 illustrates a partially broken-away view of one embodiment of a tire changing machine in accordance with the present disclosure.

Referring now to FIG. 23, a first support arm 302 extends from base 12. First support arm 302 is longitudinally moveable relative to base 12. A first powered arm cylinder 306 is attached to base 12 and is operatively connected to first support arm 302. In some embodiments, powered arm cylinder 306 is actuated by a first longitudinal control, or first position control 342, positioned on first tool assembly 300. In some embodiments, first longitudinal control 342 is a joystick control. In other embodiments, first longitudinal control 342 is positioned on base 12.

Figure 24A:
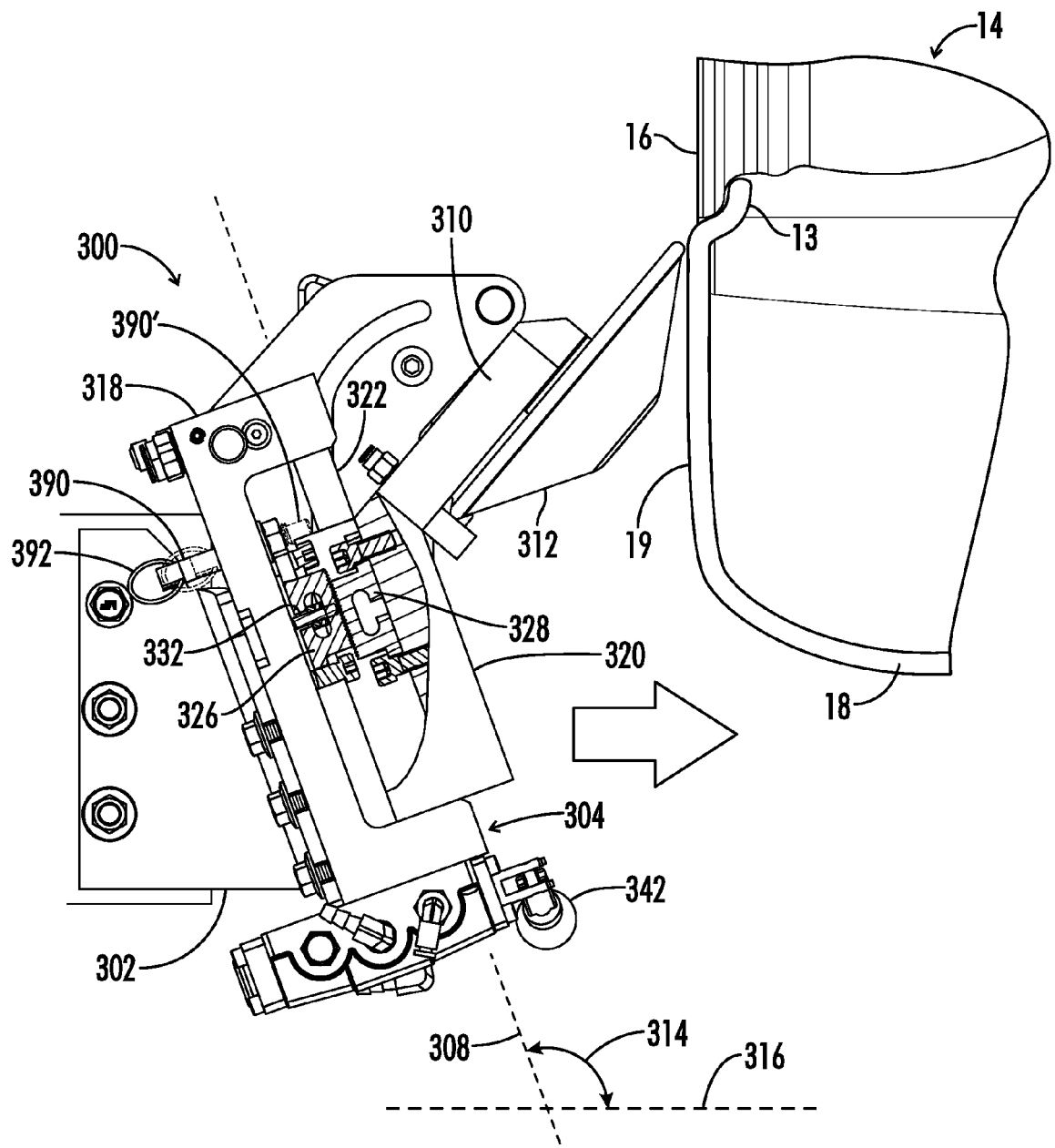
FIG. 24A illustrates a partially broken-away detail view of one embodiment of a tool assembly in accordance with the present disclosure.

In some embodiments, first tool assembly 300 includes a first travel stage 304 mounted on first support arm 302. Referring to FIG. 24A, first travel stage 304 includes a first stage base 318 and a first stage platform 320. In one embodiment, first stage platform 320 is slidably mounted on first stage base 318 by one or more base rods 322. First travel stage 304 can be a linear translation stage. Each fixed base rod 322 is slidably housed within a mating groove or bore in first stage platform 320. A first platform arm 310 extends from first stage platform 320. A first roller tool 312 is rotatably disposed on first travel stage 304 operative for engaging a tire 18 on wheel assembly 14. In some embodiments, the first roller tool 312 comprises a plastic material, such as but not limited to nylon, polypropylene, polystyrene, polyurethane, polycarbonate, polyethylene, acrylonitrile butadiene styrene and mixtures thereof. In other embodiments, first roller tool 312 can include a wood or a composite material. First travel stage 304 defines a first travel axis 308 along which first stage platform 320 translates. It is understood that, in some embodiments, first travel axis 308 may define a linear travel path. In other embodiments, first travel axis 308 can define a curvilinear travel path. In one embodiment, first travel axis 308 is oriented at a non-perpendicular first travel angle 314 relative to a reference axis 316. The reference axis 316 is aligned substantially parallel to the shaft axis of rotation 28, seen in FIG. 23. In some embodiments, first travel angle 314 is between about ninety-five degrees and about one-hundred thirty-five degrees.

Referring further to FIG. 24A, first roller tool, or first bead roller 312, is generally adapted for engaging a side wall 19, or bead 13, of a tire 18 on a wheel assembly 14 during wheel servicing operations, for example during tire mounting or dismounting. In some embodiments, first roller tool 312 is adapted for bead-loosening operations, wherein wheel assembly 14 is rotated relative to first tool assembly 300 while the first roller tool 312 rollingly engages tire 18. As indicated by the arrow in FIG. 24A, first support arm 302 can be longitudinally extended from base 12 toward wheel assembly 14 during wheel servicing, thereby applying a longitudinal force against sidewall 19, or against bead 13, with first roller tool 312.

Figure 24B:
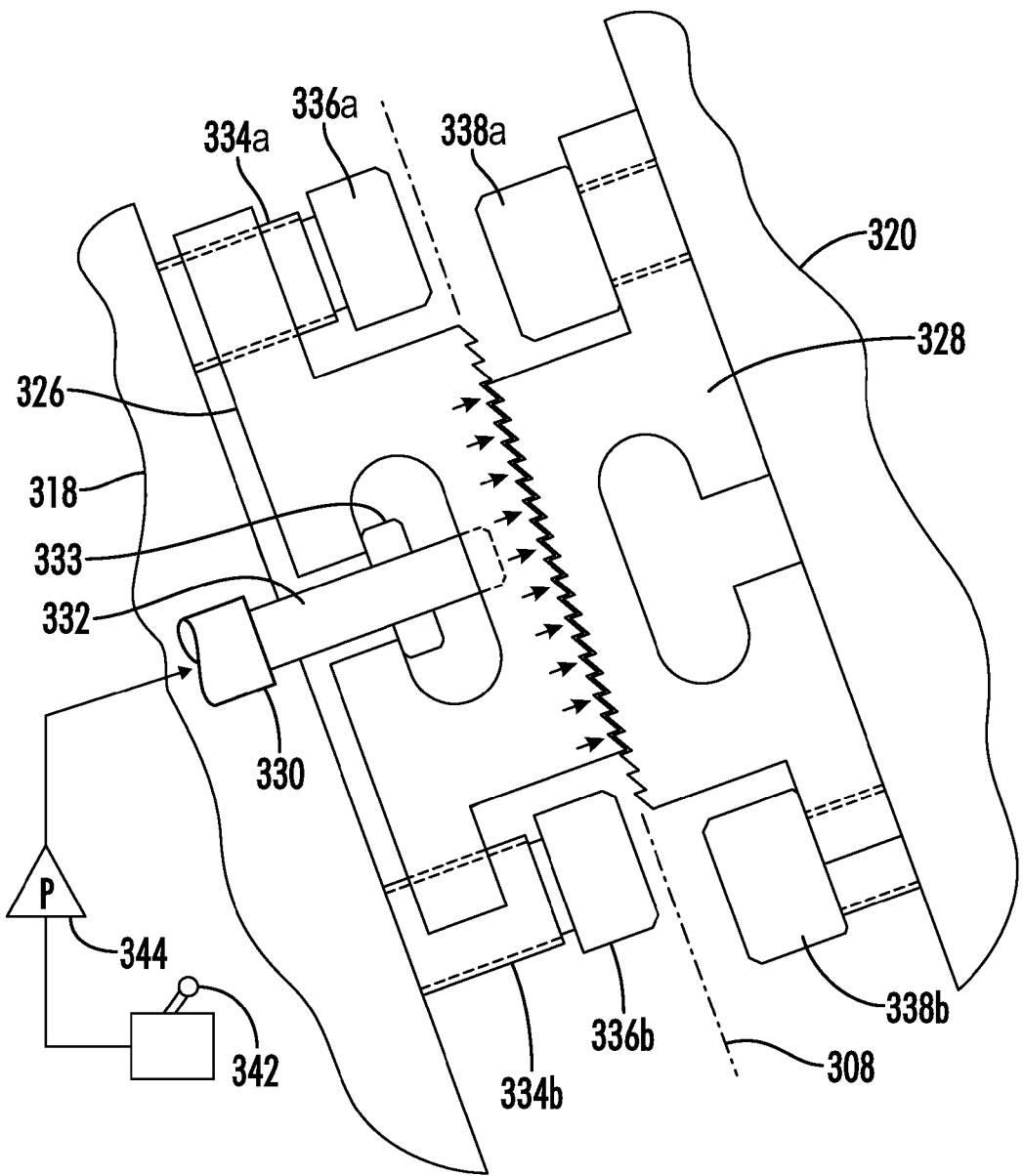
FIG. 24B illustrates a detail cross-sectional view of one embodiment of a tool assembly.
Figure 24C:
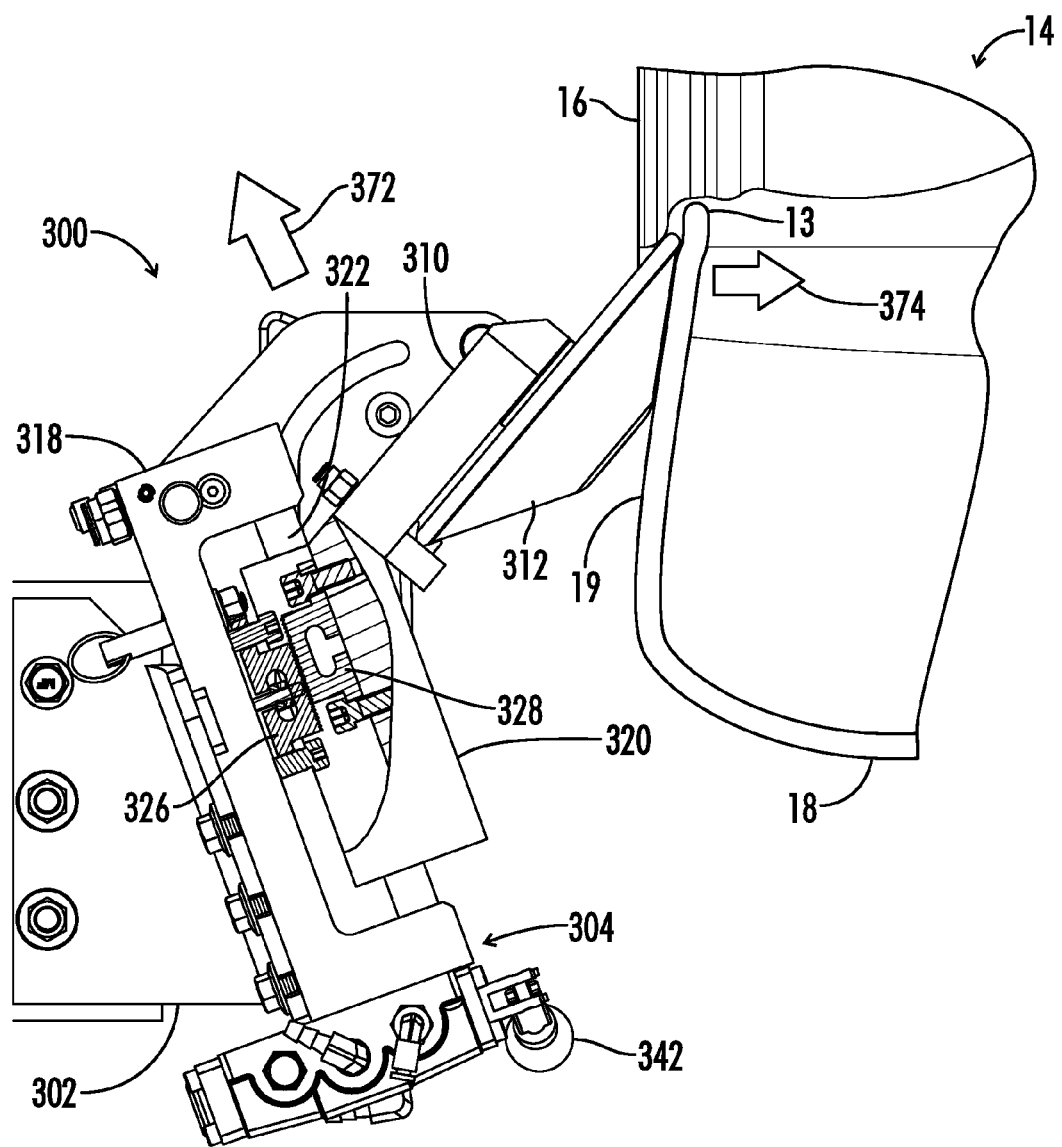
FIG. 24C illustrates a partially broken-away view of the tool assembly of FIG. 24A engaging the tire bead.

The force applied against tire 18 by first roller tool 312 generally causes tire bead 13 to loosen or separate from rim 16, as seen in FIG. 24C, allowing tire 18 to be dismounted from rim 16. Alternatively, in some mounting applications, first roller tool 312 can be used to apply a force for installing tire 18 onto wheel rim 16. In some dismounting applications, the seal between tire bead 13 and rim 16 can be difficult to loosen using only longitudinal force, and it may be necessary to advance first roller tool 312 radially inwardly toward rim 16 for completely disengaging tire bead 13 from rim 16.

Some conventional roller tool designs known in the art provide separate controls and actuators for independently moving first tire roller tool 312 in both the longitudinal and radial directions, respectively. However, the use of multiple independent actuators and controls for controlling longitudinal and radial translation of first roller tool 312 can be difficult to operate and can add cost and complexity to the tire changing machine, while also causing further damage to the wheel rim. Referring to FIG. 24C, some embodiments of the present invention provide a roller tool 312 that can self-advance toward the tire generally in the radial direction, as indicated by arrow 372, upon engagement of the tire 18 in the longitudinal direction, as indicated by arrow 374. The term "radial" as used herein indicates movement generally toward or away from the shaft axis of rotation and does not refer to strictly linear radial movement along a linear radius.

One embodiment of the present invention provides a radially self-advancing first tire roller tool 312 including only one longitudinal control 342 disposed on the first support arm 302. More specifically, in some embodiments, the longitudinal control 342 is positioned on the first tool assembly 300. The first longitudinal control 342 controls longitudinal and radial movement of first tire roller tool 312 relative to wheel rim 16. As seen in FIG. 24A, because first travel angle 314 is greater than ninety degrees in some embodiments, when first roller tool 312 engages tire 18 during rotation of the wheel assembly 14 a force vector having both radial and longitudinal components is applied to first stage platform 320. Referring to FIG. 24C, the radial force vector component acting on first stage platform 320 allows first roller tool 312 to self-advance, or climb, generally radially toward wheel rim 16 as first support arm 302 is longitudinally advanced toward wheel assembly 14, thereby enhancing bead loosening performance for separating tire 18 from wheel rim 16 as first roller tool 312 is driven between rim 16 and bead 13. Thus, a single first longitudinal control 342 can provide both longitudinal advancement of first roller tool 312 toward tire 18 and also radial self-advancement of first roller tool 312 toward rim 16.

Ratchet Assembly

As first roller tool 312 self-advances, or climbs, along sidewall 19 toward rim 16, in some applications, an opposing force between first roller tool 312 and sidewall 19 can push first roller tool 312 away from rim 16. The opposing force can prevent first roller tool 312 from properly advancing along sidewall 19. To address this problem, the present invention may further provide in some embodiments a ratchet assembly positioned on first travel stage 304 to prevent first roller tool 312 from reversing radial translation direction during radial self-advancement. Referring further to FIG. 24A, the ratchet assembly may include a base ratchet member 326 attached to first stage base 318 and a platform ratchet member 328 attached to first stage platform 320. Base ratchet member 326 and platform ratchet member 328 each include a plurality of ratchet teeth. It will be readily appreciated that, in some embodiments, platform ratchet member 328 can be integrally formed on first stage platform 320 generally facing base ratchet member 326, wherein a plurality of ratchet teeth are defined on first stage platform 320.

In one embodiment seen in FIG. 24B, platform ratchet member 328 is mechanically attached to first stage platform 320 with first and second platform fasteners 338a, 338b. In this embodiment, platform ratchet member 328 can be replaced if the plurality of ratchet teeth defined thereon becomes worn or damaged. Similarly, the use of platform fasteners 338a, 338b allows ratchet members with different ratchet tooth dimensional configurations to be interchangeably used on one ratchet assembly.

Base ratchet member 326 is attached to first stage base 318 by base fasteners 336a, 336b. In one embodiment, each base fastener 336a, 336b is a threaded bolt. Each bolt includes an outer sleeve 334a, 334b positioned on each respective base fastener. Each outer sleeve engages a recess in base ratchet member 326 for allowing base ratchet member 326 to slide both toward first stage platform 320 and back toward first stage base 318. In one embodiment, base ratchet member 326 slides on outer sleeves 334a, 334b in a direction substantially perpendicular to travel axis 308. In some embodiments, each sleeve 334a, 334b provides a reduced coefficient of friction between base ratchet member 326 and each sleeve for improving sliding performance of base ratchet member 326. In some embodiments, each sleeve 334a, 334b includes a plastic material. In one embodiment, one or both sleeves may be formed of polytetrafluoroethylene.

Also seen in FIG. 24B, a powered ratchet cylinder 330 is attached to first stage base 318. In one embodiment, a first ratchet rod 332 is operatively connected to and extends from powered ratchet cylinder 330. Rod 332 is attached to base ratchet member 326. In some embodiments, ratchet rod 332 is at least partially threaded, and a threaded nut 333 engages ratchet rod 332 for securing base ratchet member 326 to ratchet rod 332. Powered ratchet cylinder 330 in one embodiment may be a pneumatic linear actuator and is operatively coupled to a pressure valve 344 for controlling the position of first ratchet rod 332. The pressure valve 344 is connected to a pressure source such as a compressor or pressurized gas tank or pressurized gas line. In one embodiment, pressure valve 344 may be an electronic solenoid valve. In other embodiments, pressure valve 344 may be a mechanical valve actuated by operation of first longitudinal control 342. In one embodiment, first ratchet cylinder 330 is operatively connected to first longitudinal control 342 so that when first longitudinal control 342 is actuated in a first direction, seen in FIG. 24B, ratchet rod 332 is biased toward base ratchet member 326, causing base ratchet member 326 to ratchetedly engage platform ratchet member 328.

In some embodiments, first longitudinal control 342 is operatively connected to both first powered arm cylinder 306, seen in FIG. 23, and powered ratchet cylinder 330. Referring further to FIGS. 24A and 24C, when first longitudinal control 342 is operated to longitudinally advance first support arm 302 toward tire 18, in some embodiments, pressure valve 344 is opened and pressurized gas is fed to powered ratchet cylinder 330, actuating a piston inside powered ratchet cylinder 330 and causing ratchet rod 332 to extend from ratchet cylinder 330, thereby pushing base ratchet member 326 toward platform ratchet member 328. Thus, when first support arm 302 is longitudinally advanced away from base 12 toward tire 18, powered ratchet cylinder 330 provides an engagement force between base ratchet member 326 and platform ratchet member 328, causing the ratchet teeth on each ratchet member to become engaged.

In some applications, it is desirable to prevent first stage platform 320 from moving radially toward wheel rim 16 relative to first stage base 318 when first roller tool 312 engages tire 18. Referring again to FIG. 24A, in one embodiment a locking pin 390 extends through first stage base 318. Locking pin 390 can extend to a locked position 390' for blocking radial movement of first stage platform 320. Locking pin 390 includes a ring 392 for manually positioning locking pin in a locked or unlocked position. In some embodiments, a locking spring may be disposed between locking pin 390 and first stage base 318 for biasing the locking pin in a locked or unlocked position. When locking pin 390 is in the retracted, or unlocked position seen in FIG. 24A, stage platform 320 is generally free to translate radially inwardly toward wheel rim 16.

Ratchet Release

After the first roller tool 312 has advanced beyond the outermost radial edge of rim 16, as illustrated in FIG. 24C, it may be desirable to reverse first support arm 302 longitudinally back toward the base. However, from the position seen in FIG. 24C, it is difficult to longitudinally retract first support arm 302 backwards without first roller tool 312 interfering with rim 16. Thus, it is necessary to radially retract, or release, first roller tool 312 radially away from rim 16 prior to longitudinal translation of first support arm 302 backwards toward the base. Radial retraction of first roller tool 312 from the position seen FIG. 24C generally requires disengagement of the ratchet members 326, 328 to allow first stage platform 320 to slide on first travel stage 304 radially away from wheel assembly 14.

Figure 24D:
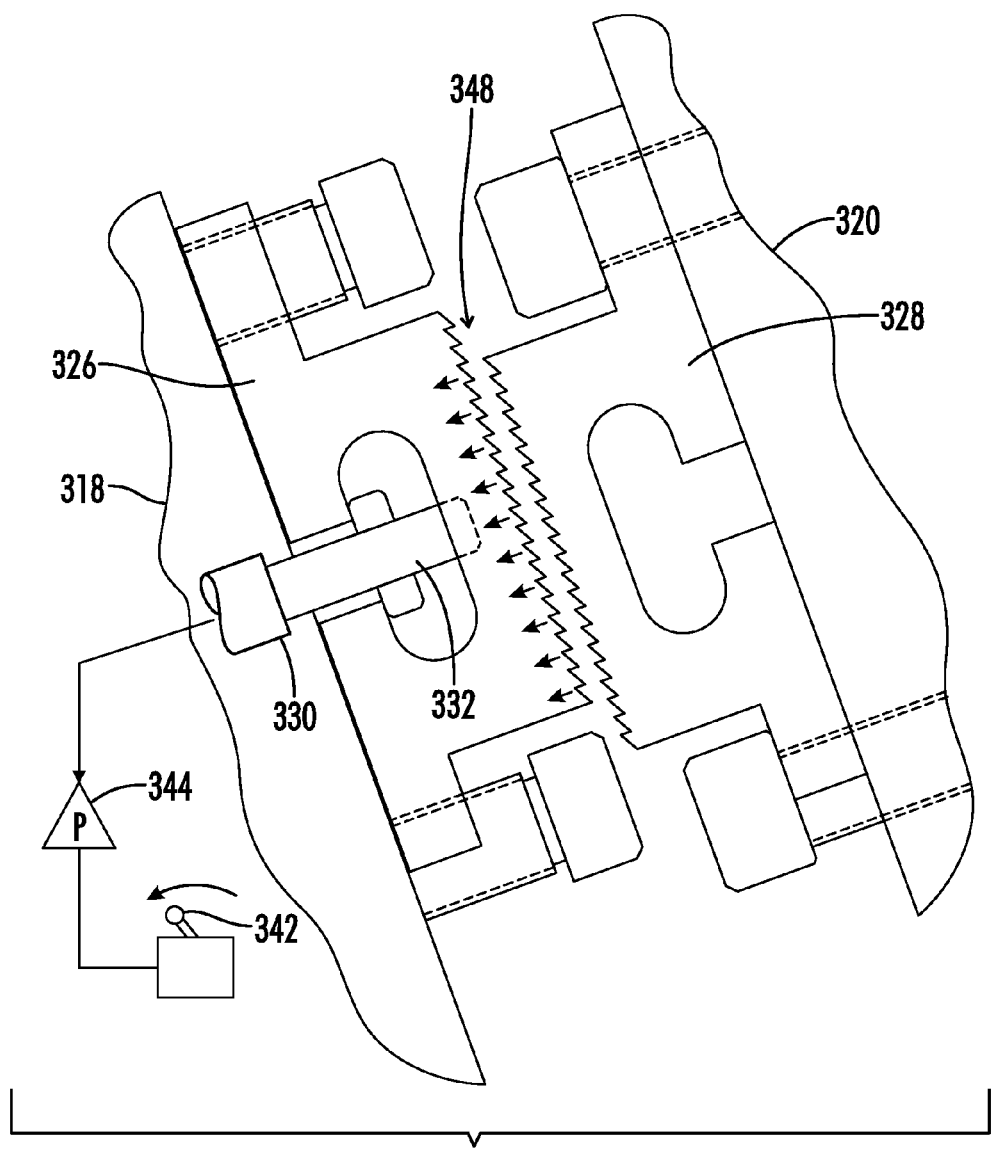
FIG. 24D illustrates a partially broken away view of the tool assembly of FIG. 24B in a disengaged position.

One embodiment of the present invention provides a ratchet assembly that automatically disengages upon reversing the direction of longitudinal translation of the first support arm 302, thereby allowing first roller tool 312 to radially retract. Referring now to FIG. 24D, when first longitudinal control 342 is actuated in a second direction, pressure valve 344 is activated to reduce pressure in first ratchet cylinder 330, thereby retracting first ratchet rod 332. Retraction of first ratchet rod 332 causes disengagement of base ratchet member 326 from platform ratchet member 328, creating a ratchet gap 348. When the ratchet assembly is disengaged, first stage platform 320 can move radially away from the wheel assembly, and first roller tool 312 is allowed to clear the outer radial edge of wheel rim 16. Also, because first longitudinal control 342 is coupled to powered arm cylinder 306 in some embodiments, first support arm 302 is also simultaneously translated longitudinally toward base 12 by operation of first longitudinal control 342 in the second direction.

Referring again to FIG. 23, in some embodiments a second tool assembly 350 is disposed on a platform tool arm 290. Platform tool arm 290 is attached to and extends generally vertically from second support arm 352. In some embodiments, second support arm 352 is housed in a platform assembly. In other embodiments, second support arm 352 includes a platform carriage slidably attached to a longitudinal platform stage, and platform tool arm 290 extends generally vertically from the platform carriage. It is understood that in some embodiments second tool assembly 350 includes a similar ratcheting mechanism as discussed above in first tool assembly 300, including a second travel stage 354. Similarly, second tool assembly 350 includes a second longitudinal control 368 that is operatively connected to both second powered cylinder 356 and a second powered ratchet cylinder for engaging and disengaging the second ratchet assembly. As seen in FIG. 23, second tool assembly 350 includes a second travel stage 354 having a second linear travel axis 358. Second linear travel axis 358 is oriented at a second travel angle 364 relative to reference axis 316 aligned parallel to shaft axis of rotation 28, wherein second travel angle 364 is greater than about ninety degrees. As such, second tool assembly, or second ratcheting roller assembly 350, also performs a radially self-advancing function for second roller tool 292 during tire engagement. Second roller tool 292 can be used for bead loosening, or breaking of the seal between the rim and the tire, during tire dismounting and also for applying force against a bead for installing a tire on a wheel rim.

Travel Arm

Figure 25:
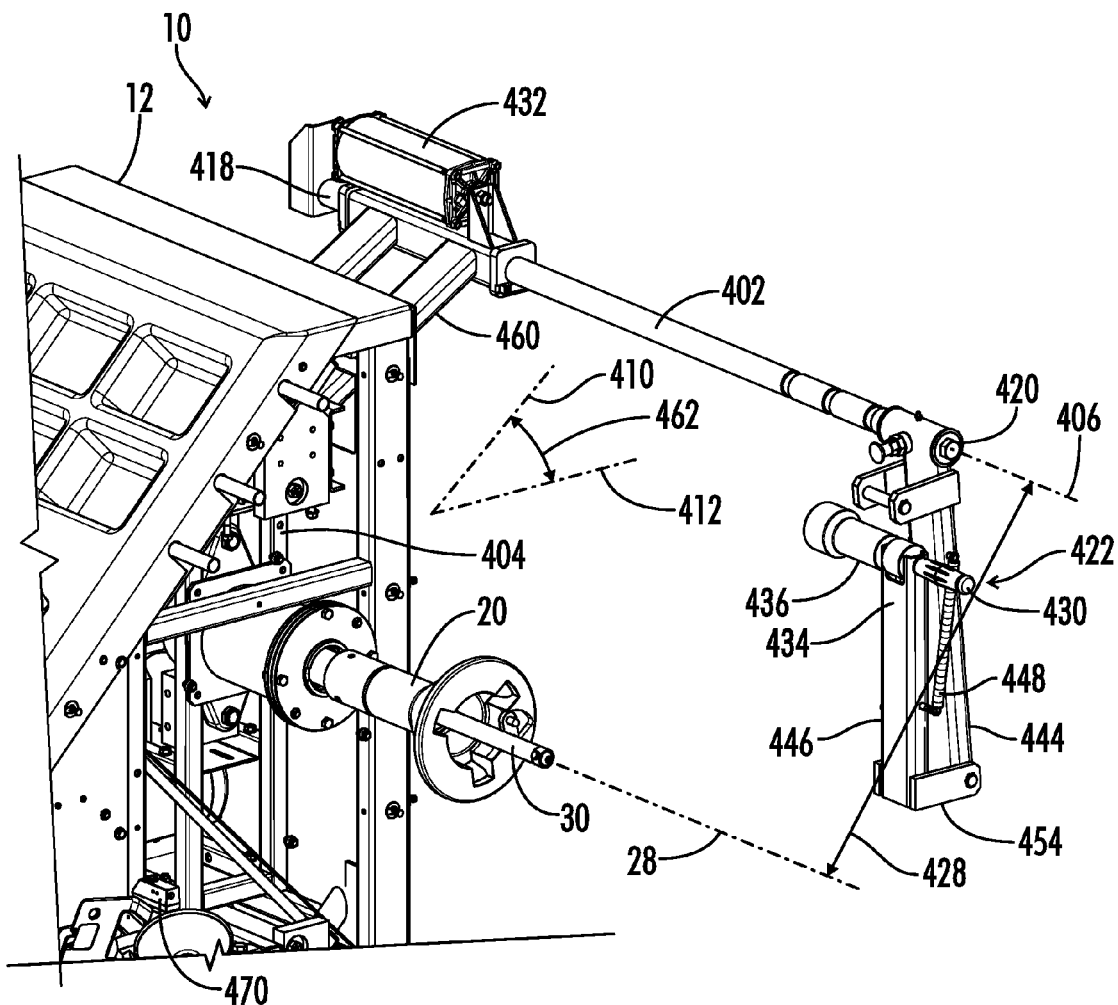
FIG. 25 illustrates a partial perspective view of one embodiment of a tire changing machine showing a longitudinal travel arm.
Figure 26:
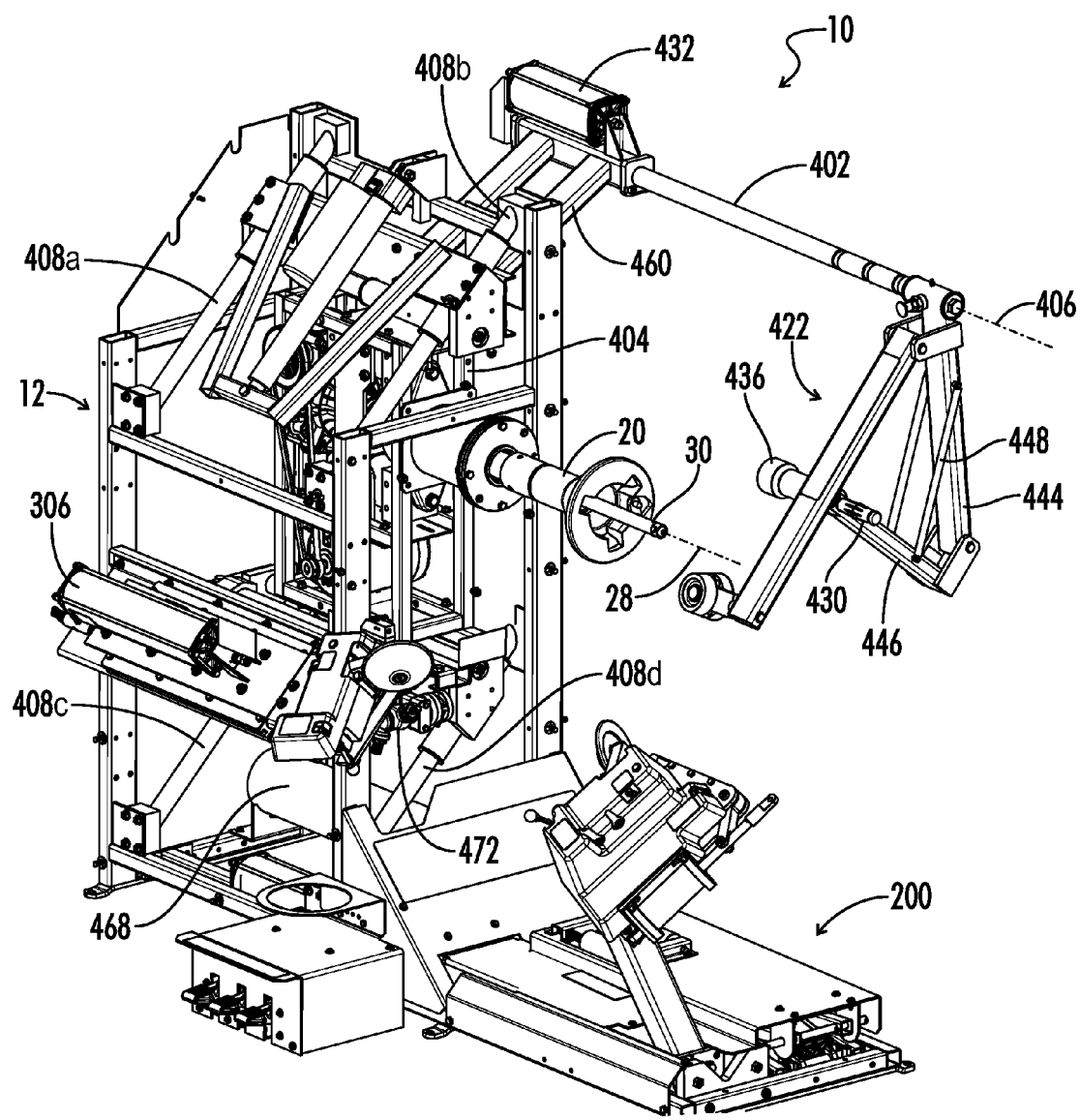
FIG. 26 illustrates a partially broken-away view of one embodiment of a tire changing machine in accordance with the present disclosure.

Referring now to FIG. 25 and FIG. 26, yet another embodiment of the present invention provides a tire changing machine 10 having a base 12 with a rotatable shaft 20 extending from base 12. A travel arm 402 extends generally horizontally from base 12, and a powered travel arm cylinder 432 is operatively attached to travel arm 402 for translating travel arm 402 longitudinally relative to base 12. A jointed helper arm, or jointed auxiliary arm 422, is pivotally attached to travel arm 402. In one embodiment, jointed auxiliary arm 422 extends vertically downward from travel arm 422 in a stored position, as seen in FIG. 25. Jointed auxiliary arm 422 includes an auxiliary arm distal end 434, and a tire tool 436 is attached to the auxiliary arm distal end 434. In some embodiments, the tire tool 436 is a contact block shaped for pressing against a tire side wall during tire installation or mounting. In some embodiments, tire tool 436 may be formed of a plastic material to prevent damage to a cosmetic surface of the wheel rim.

In some embodiments, rotatable shaft 20 is mounted on a shaft carriage 404 housed inside base 12. Shaft carriage 404 is generally moveable relative to base 12 along an inclined carriage track 408. In one embodiment, a powered carriage cylinder is disposed on base 12 for translating shaft carriage 404 along carriage track 408 at an inclined angle. A powered shaft cylinder is disposed on base 12 in some embodiments and is operatively coupled to shaft carriage 404 for longitudinally translating shaft carriage 404. Thus, shaft carriage 404 generally includes at least two degrees of freedom, one along an inclined axis 410 and one in the longitudinal direction substantially parallel to the shaft axis of rotation 28, seen in FIG. 25. A powered rod cylinder is also disposed on shaft carriage 404 for longitudinally translating retractable rod 30 relative to rotatable shaft 20. In some embodiments, powered shaft cylinder and powered rod cylinder translate with carriage 404 as shaft carriage 404 moves along carriage track 408. As seen in FIG. 26, carriage track 408 in some embodiments includes multiple inclined carriage track members 408a, 408b, 408c, 408d supporting shaft carriage 404. Referring to FIG. 25, carriage track 408 generally includes an inclined carriage translation axis 410 oriented at an inclined carriage track angle 462 relative to horizontal reference axis 412. In one embodiment, one or more carriage arms 460 rigidly extend from shaft carriage 404 through one or more openings in base 12.

Travel arm 402 is attached to carriage arm 460. Travel arm 402 defines a longitudinal travel arm axis 406 along which travel arm 402 can longitudinally move. In one embodiment, longitudinal travel arm axis 406 is oriented substantially parallel to shaft axis of rotation 28. Travel arm 402 generally defines a fixed distance 428, seen in FIG. 25, between longitudinal travel arm axis 406 and shaft axis of rotation 28 during movement of the shaft carriage 404 relative to base 12. Fixed distance 428 is chosen to be greater than the largest radius wheel assembly to be serviced on tire changer apparatus 10. Travel arm 402 includes a travel arm proximal end 418 attached to shaft carriage 404 and a travel arm distal end 420 extending away from shaft carriage 404.

Auxiliary Arm

Figure 27:
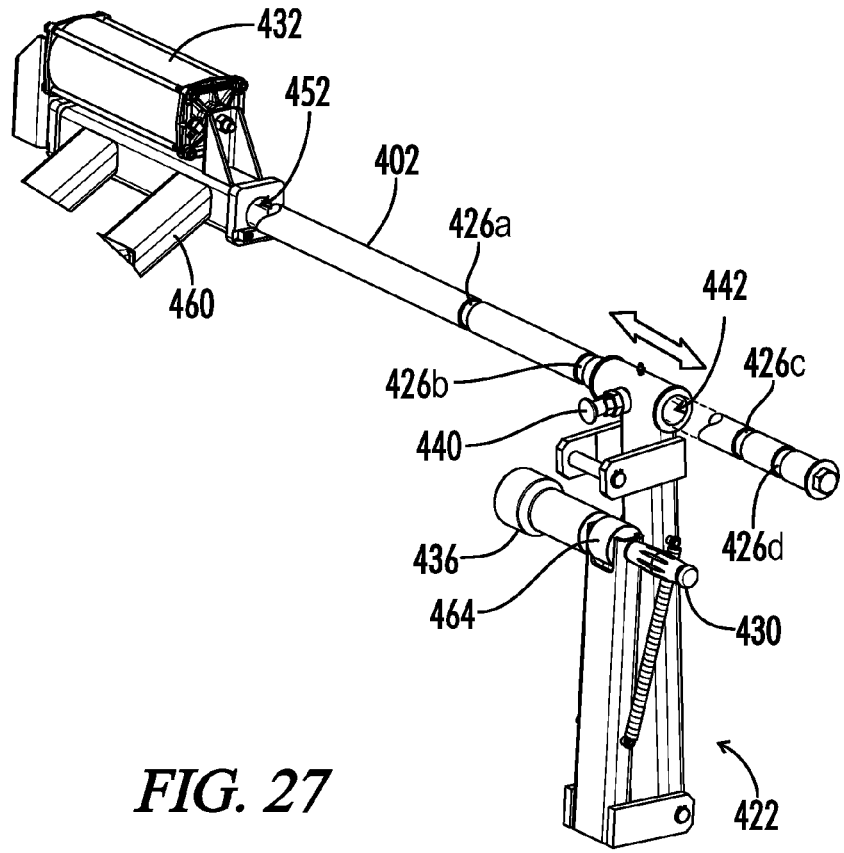
FIG. 27 illustrates a partial elevation view of one embodiment of a travel arm.
Figure 28:
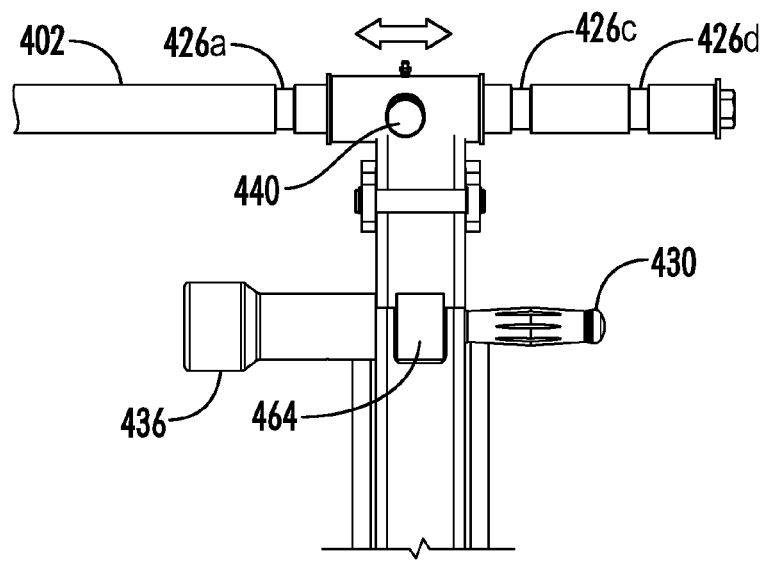
FIG. 28 illustrates a partial elevation view of one embodiment of a travel arm.

Jointed auxiliary arm 422 is pivotally mounted to travel arm 402 between travel arm proximal end 418 and travel arm distal end 420. Jointed auxiliary arm 422, seen in FIG. 27, includes an arm socket 442 slidably engaging travel arm 402. In one embodiment, arm socket 442 has the shape of a hollow cylinder slidably engaging travel arm 402. Travel arm 402 defines one or more transverse recesses 426a, 426b, 426c, 426d, etc., also seen in FIG. 28. In some embodiments, a releasable latch 440 is disposed on auxiliary arm 422 for individually engaging one of the transverse recesses. Releasable latch 440 in some embodiments includes a radially-extending post slidably housed in a post socket and including a latch spring biasing the post radially toward the travel arm 402. The post engages a transverse recess for selectively securing jointed auxiliary arm 422 in a first longitudinal position defined at the transverse recess location.

Referring again to FIG. 25, in one embodiment auxiliary arm 422 includes first arm member 444 and second arm member 446 pivotally joined at first pivoting joint 454. A first auxiliary arm spring 448 extends from first arm member 444 to second arm member 446 biasing auxiliary arm 422 in a closed position. A handle 430 is positioned on auxiliary arm 422 such that a user can pivotally extend auxiliary arm 422 away from travel arm 402.

Referring again to FIG. 27, in one embodiment the carriage rod 460 defines a travel opening 452 shaped for slidably receiving travel arm 402. A powered travel arm cylinder 432 is attached to the carriage rod 460 and travel arm 402 and is operative for controlling the longitudinal position of travel arm 402. Powered travel arm cylinder 432 in one embodiment is a pneumatic cylinder, or pneumatic linear actuator connected to a pressure source. A travel arm control is located on base 12 for operatively controlling powered travel arm cylinder 432 and travel arm position.

Auxiliary arm 422 can be positioned longitudinally relative to a wheel mounted on rotatable shaft in at least three ways. First, auxiliary arm 422 can be manually repositioned between transverse recesses 426a, 426b, etc. on travel arm 402 using releasable latch 440. Second, auxiliary arm 422 can remain in a constant longitudinal position on travel arm 402 while travel arm 402 is longitudinally translated by powered travel arm cylinder 432. Third, both travel arm 402 and auxiliary arm 422 can remain in a constant longitudinal position and rotatable shaft 20 can be longitudinally repositioned by actuation of the powered shaft cylinder, thereby adjusting the position of a wheel mounted on shaft 20 relative to auxiliary arm 422.

Figure 29A:
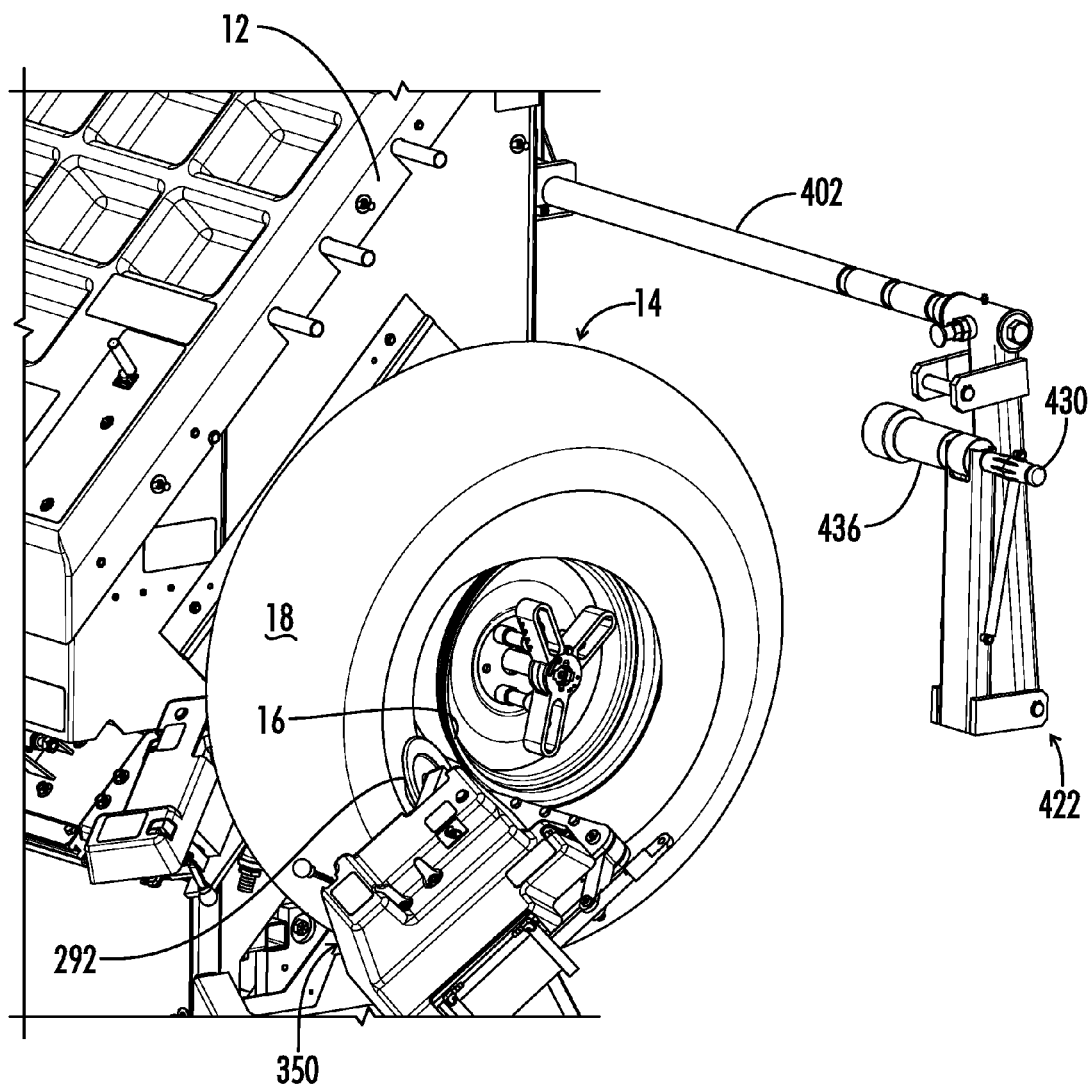
FIG. 29A illustrates a partial perspective view of one embodiment of a tire changing machine.
Figure 29B:
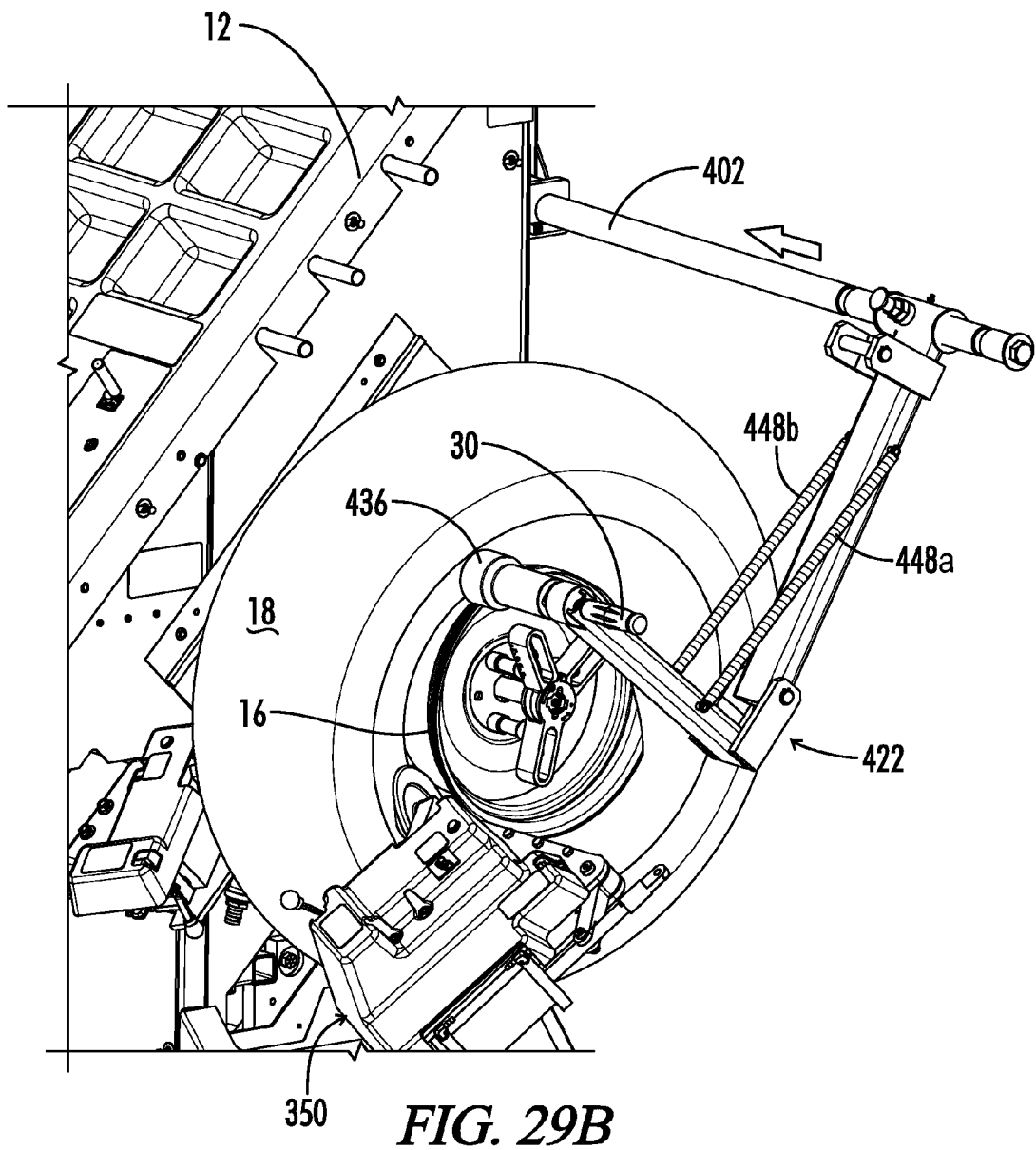
FIG. 29B illustrates a partial perspective view of one embodiment of the tire changing machine of FIG. 29A.

Auxiliary arm 422 can be used to assist in tire mounting operations. Generally, during a tire mounting operation, a wheel assembly 14 is mounted on shaft 20, as seen in FIG. 29A. The tire 18 is positioned loosely over rim 16. In some embodiments, second tool assembly 350 is positioned such that second roller tool 292 engages tire 18. Alternatively, a bead tool 370 may extend from second tool assembly 350 and engage the sidewall of tire 18. In some embodiments, both second roller tool 292 and bead tool 370 are positioned on second tool assembly 350 and engage the sidewall of tire 18. From the initial starting position, a user can manually extend jointed auxiliary arm 422 using handle 430, as seen in FIG. 29B, such that tire tool 436 is aligned with the sidewall of tire 18 adjacent rim 16 generally above second tool assembly 350. From this position, the operator can actuate powered travel arm cylinder 432 to longitudinally move travel arm 402 towards base 12, thereby pressing tire tool 436 against tire 18.

Figure 29C:
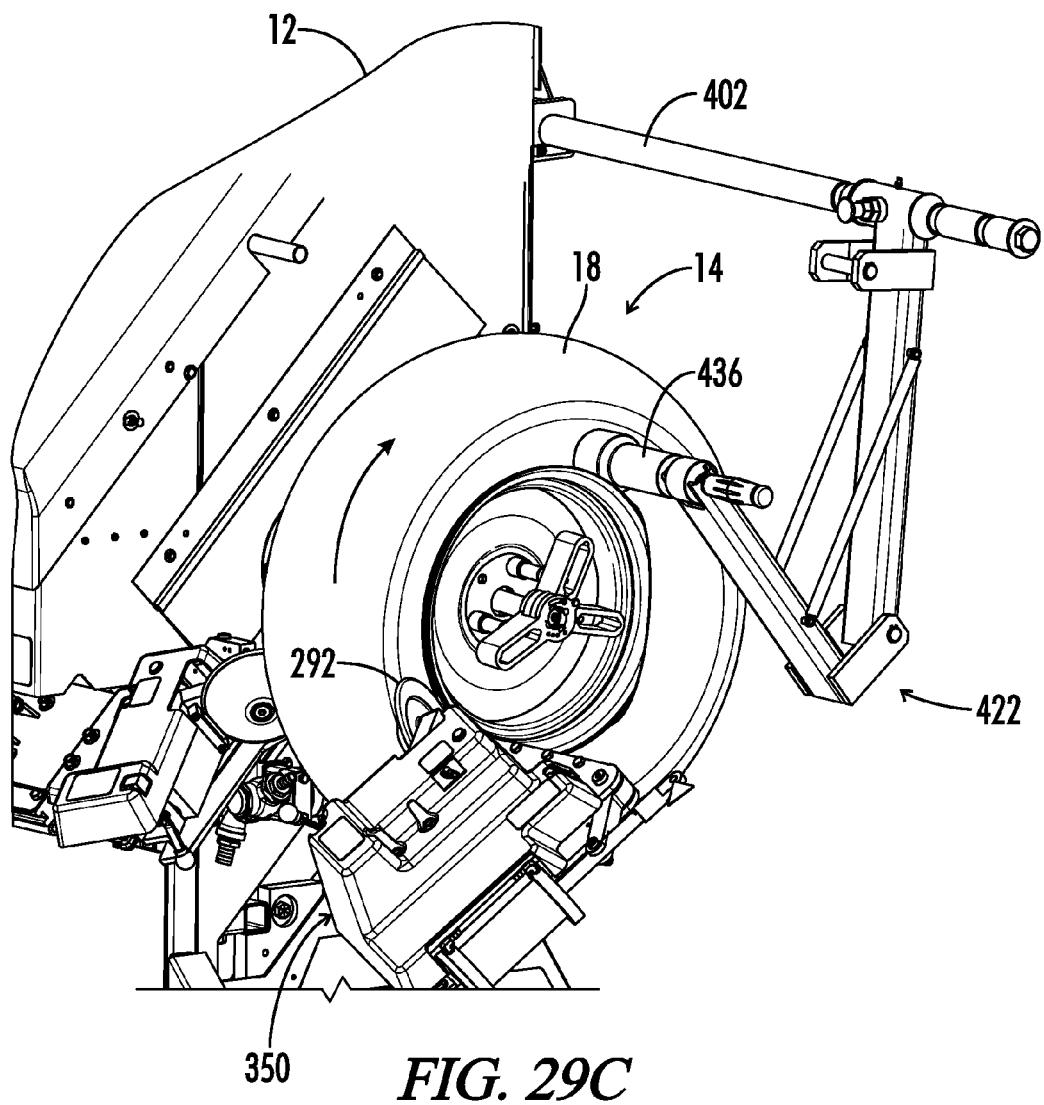
FIG. 29C illustrates a partial perspective view of one embodiment of the tire changing machine of FIG. 29A.
Figure 29D:
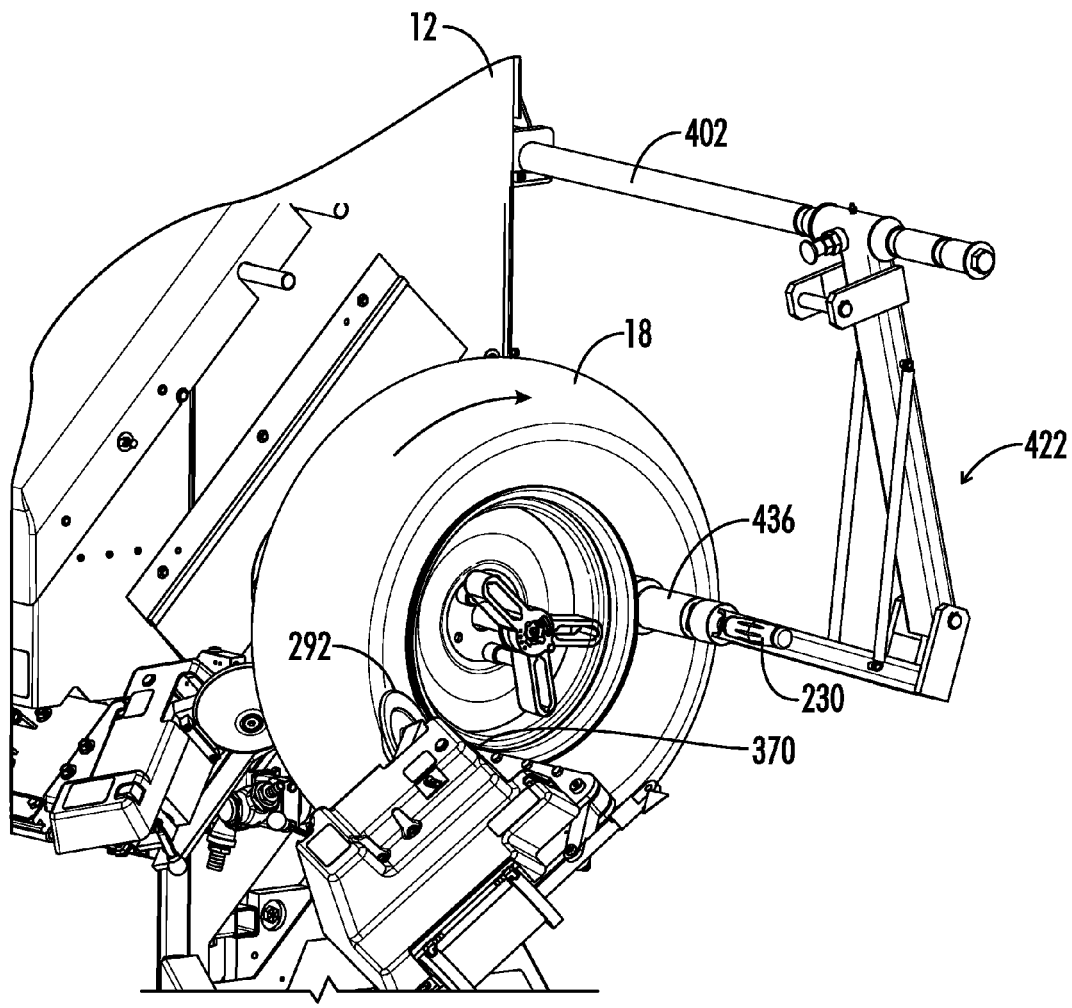
FIG. 29D illustrates a partial perspective view of one embodiment of the tire changing machine of FIG. 29A.

Referring now to FIG. 29C, the operator can initiate rotation of the rotatable shaft, causing wheel assembly 14 to rotate. As wheel assembly 14 rotates, second roller tool 292 and/or bead tool 370 presses longitudinally against sidewall of tire 18 while tire tool 436 simultaneously revolves around rotatable shaft 20 with wheel assembly 14, maintaining local longitudinal pressure against the sidewall of tire 18. As the tire continues to rotate, the tire tool moves around the shaft axis of rotation with the tire, applying the longitudinal force for pressing the tire bead over the edge of the wheel rim. Eventually, as seen in FIG. 29D, the tire bead becomes fully seated behind the wheel rim and the auxiliary arm 422 can be longitudinally disengaged and returned to the stored position using handle 230.

Figure 30A:
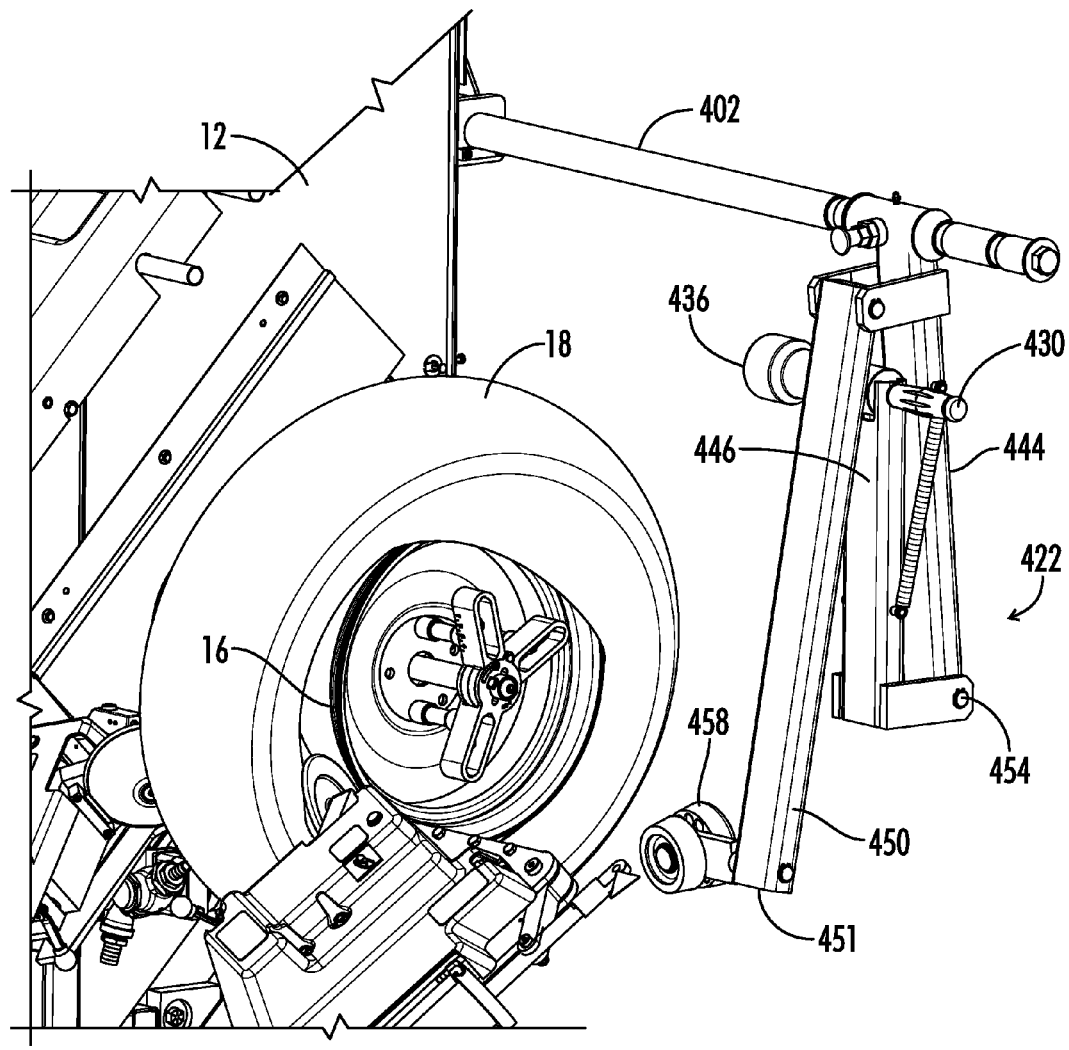
FIG. 30A illustrates a partial perspective view of one embodiment of a tire changing machine showing a jointed auxiliary arm.

Yet another embodiment of the present invention, seen in FIG. 30A, provides a jointed helper arm, or jointed auxiliary arm 422, having an additional wheel support member 450 pivotally attached to the first arm member 444 between first pivoting joint 454 and travel arm 402. Wheel support member 450 includes a wheel support member distal end 451. In some embodiments, a support wheel 458 is pivotally attached to the wheel support member distal end 451 of the wheel support member 450. In one embodiment, a handle 430 is positioned on second arm member 446 for manually extending both tire tool 436 and support wheel 458.

Figure 30B:
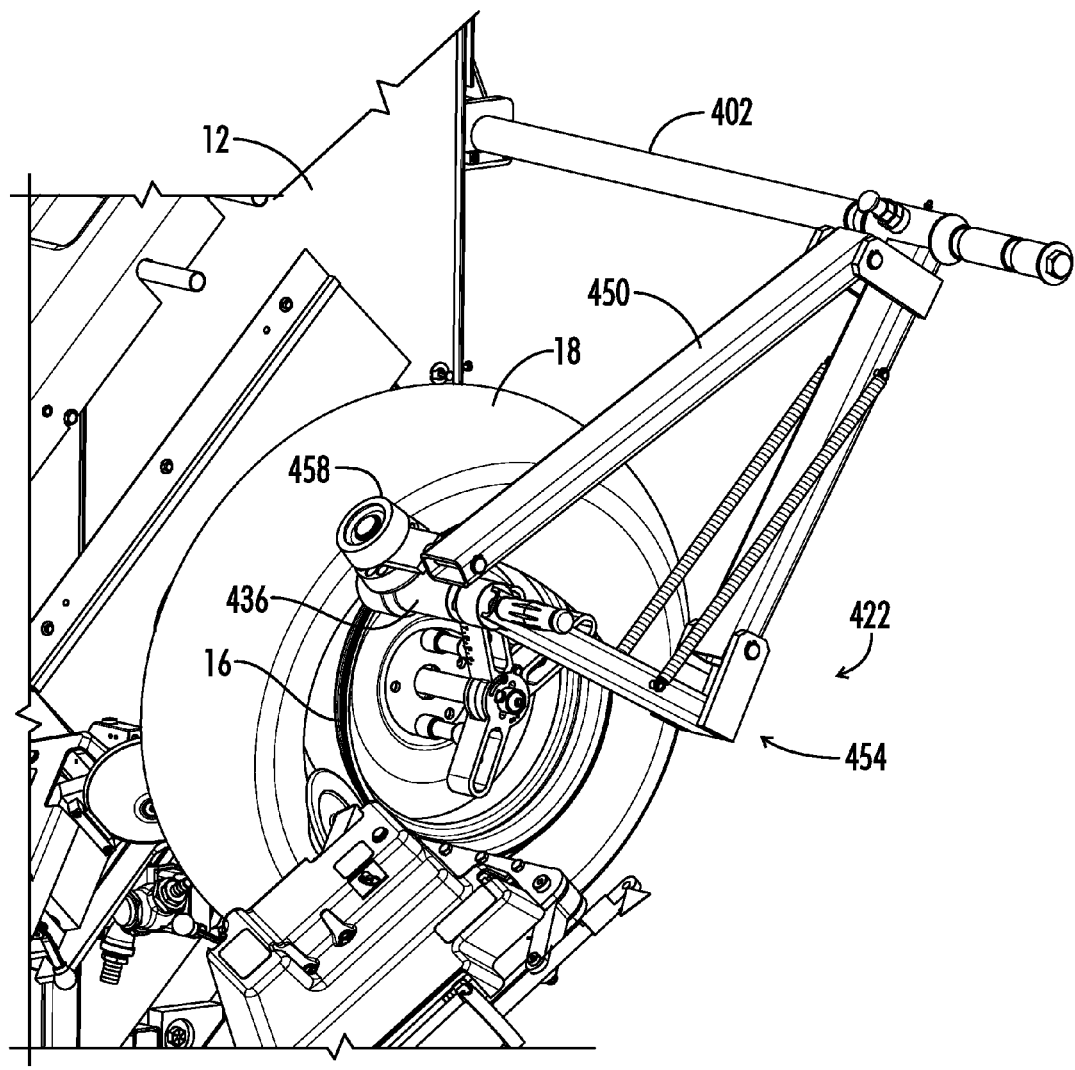
FIG. 30B illustrates a perspective view of one embodiment of the jointed auxiliary arm of FIG. 44 engaging a wheel assembly.
Figure 31:
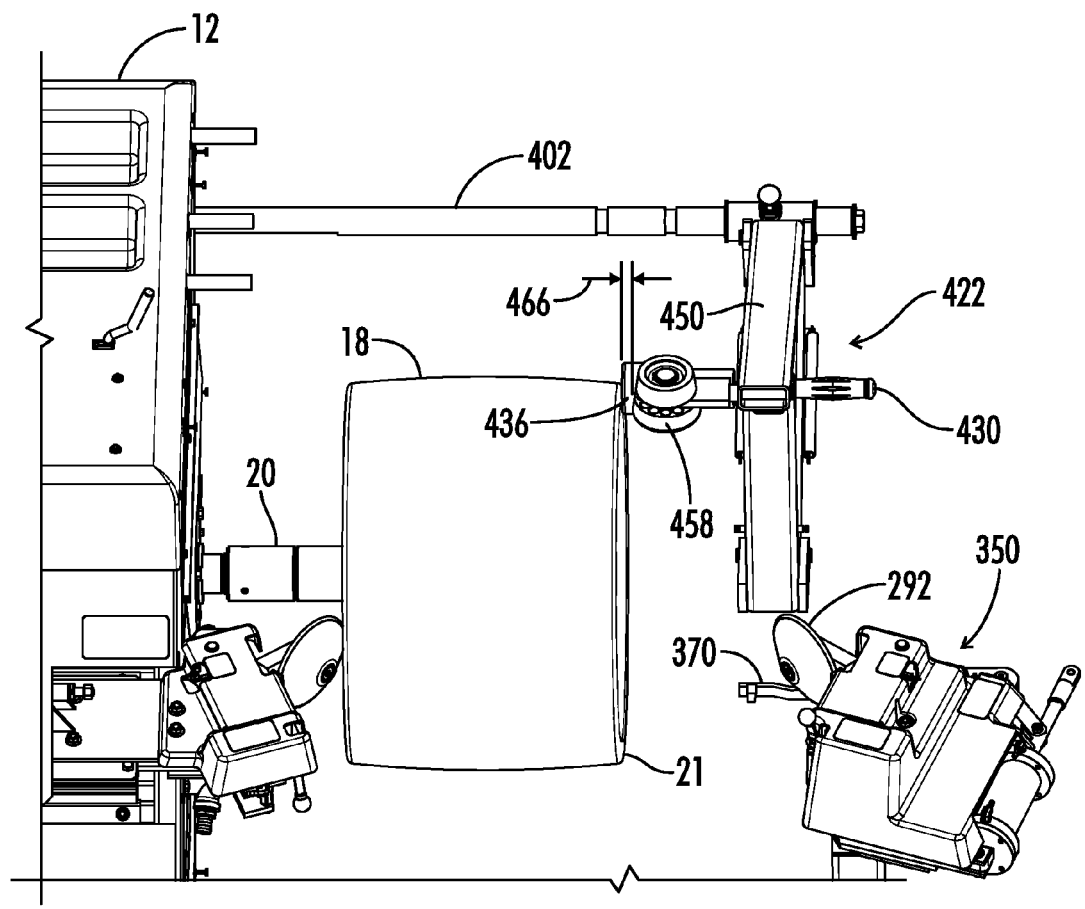
FIG. 31 illustrates an elevation view of one embodiment of a tire changing machine showing a tool head offset.

During use, an operator manually extends jointed auxiliary arm 422 using handle 430. Tire tool 436 is first aligned with the outer longitudinal edge of tire 18, as seen in FIG. 31. In this position, the tire tool 436 extends a first longitudinal distance from the base 12 and the support wheel extends a second longitudinal distance from base 12. In one embodiment, the second distance is greater than the first distance, and the tire tool 436 and support wheel 458 are longitudinally offset by a tool offset distance 466. In one embodiment, tool offset distance 466 is between about five and about one hundred millimeters. The tool offset distance 466 allows the tire tool 436 to engage the tire 18 first. The support wheel 458 engages the tire 18 in this embodiment only after the tire tool 436 has been advanced longitudinally toward the tire, compressing the side wall. It is understood that the tire tool 436 can be pushed axially inward either by translating the shaft 20 outward via the powered shaft cylinder or by longitudinally translating the travel arm 402 inward via the powered arm cylinder. After the tire tool 436 is positioned against tire 18, wheel rotation is initiated and the user is free to guide support wheel 458 as tire tool 436 simultaneously revolves around shaft 20 with wheel assembly 14, as seen in FIGS. 30A and 30B.

Referring again to FIG. 16, in some embodiments a laser alignment module 470 is attached to base 12. Laser alignment module 470 is rigidly positioned on base 12 and includes a laser aperture for emitting laser light toward a tire. Laser alignment module 470 is generally aligned with first tire roller tool 312 so that a roller tool engagement location will be illuminated on a tire 18 when laser alignment module is activated. A switch 474 is positioned on laser alignment module 470 in some embodiments. When first roller tool 312 is longitudinally advanced toward tire 18, first roller tool 312 generally engages the tire at the illuminated roller tool engagement location. Thus, an operator can activate laser alignment module 470 to determine the location where first tire roller tool 312 will engage the tire and subsequently adjust the position of shaft 20 along the inclined carriage track relative to first roller tool for optimizing the roller tool engagement location.

Additionally, seen in FIG. 26, a fixed position air jet orifice 472 is attached to base 12. A compressed air tank 468 is also positioned on base 12 and is operatively attached to air jet orifice 472 by an air jet hose. The air jet orifice 472 can be used to blast a jet of air toward tire 18 for inflating the tire or for loosening the seal between a tire and a wheel rim.

Wheel Clamping Apparatus

Referring again to FIG. 13, an adjustable wheel holding assembly, or wheel clamp 120, for use on a wheel servicing machine having a rotatable shaft and a rod extending from the shaft is generally illustrated. The wheel clamp 120 includes a hub 144 having a central axis 146. A plurality of arms extends generally radially from the hub. At least one arm is angularly moveable relative to at least one other arm. At least one arm on wheel clamp 120 can be rotated about the hub for configuring the wheel clamp 120 to engage various corresponding lug hole patterns on different models of wheel rims.

Figures 32A, 32B, 32C:
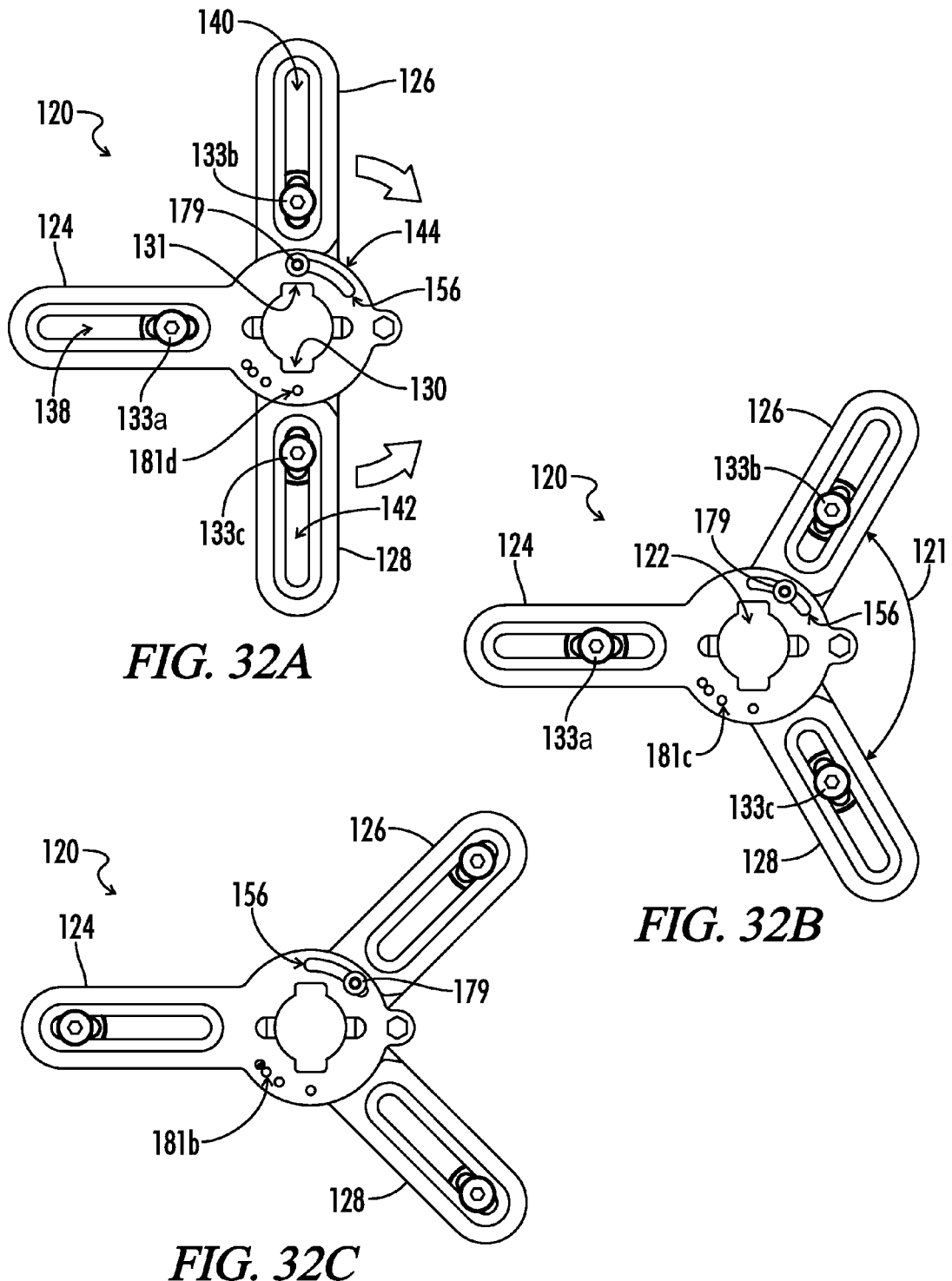
FIG. 32A illustrates one embodiment of a wheel clamp in accordance with the present invention.
FIG. 32B illustrates the wheel clamp of FIG. 32A in a different lug hole pattern engagement configuration.
FIG. 32C illustrates the wheel clamp of FIG. 32A in yet a different lug hole pattern engagement configuration.

For example, as seen in FIG. 32A, the wheel clamp 120 in one embodiment includes a first arm position wherein each first, second and third arm 124, 126, 128 extends radially from hub 144 oriented at a generally ninety degree angle relative to its nearest adjacent arm. This configuration is generally adapted for engaging a four-hole, or square, lug hole pattern on a wheel rim. In this embodiment, first and second arms 126, 128 are angularly moveable relative to first arm 124 and relative to hub 144. As seen in FIG. 32B, second and third arms 126, 128 can be rotated toward each other, causing the arm angle 121 between second and third arms 126, 128 to decrease. By moving one or more arms relative to at least one other arm, additional lug hole configurations can be engaged by wheel clamp 120. As one or more arms are moved from the first arm position, an acute arm angle 121 is formed between at least two arms, forming a second arm position. In FIG. 32B, the arm angle 121 is about one-hundred and twenty degrees, and wheel clamp 120 is configured to engage a six-hole, or hexagonal, lug hole pattern on a wheel rim. Also seen in FIGS. 32A and 32B, each pin fastener 133a, 133b, 133c can be adjusted radially along its respective radial slot 138, 140, 142 respectively, to adjust the radial position of each pin 132, 134, 136, seen in FIG. 13. For example, in FIG. 32B, each pin fastener 133a, 133b, 133c has been moved radially outward relative to its initial position illustrated in FIG. 32A. Referring now to FIG. 32C, each second and third arm 126, 128 can be further moved angularly relative to first arm 124 to engage a pentagonal or octagonal lug hole configuration.

Wheel clamp 120 includes an inner side, or pin side, from which pins 132, 134, 136 extend. The inner side generally faces the wheel rim when wheel clamp 120 is installed on a wheel servicing machine. The wheel clamp 120 also includes an outer side generally facing away from the wheel rim when the wheel clamp is installed on a wheel servicing machine. The outer side is generally illustrated in FIGS. 32A-32C.

Each arm 124, 126, 128 includes at least one base plate, or socket. Each base plate is a substantially flat plate protruding from an end of its corresponding arm. Each base plate can be integrally formed on each arm or can be attached to each arm using one or more mechanical fasteners. Generally, the multiple base plates are concentrically aligned to form hub 144. When combined, the base plates define the clamp aperture 122.

Figure 33A:
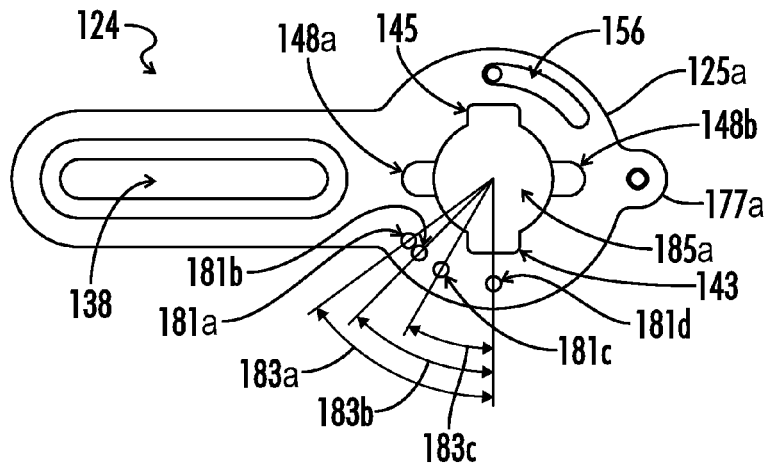
FIG. 33A illustrates an outer side plan view of one embodiment of a first arm in accordance with the present invention.
Figure 33B:
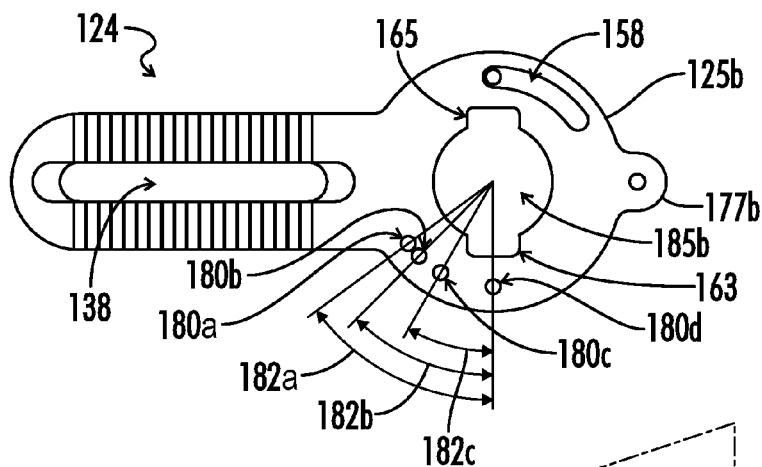
FIG. 33B illustrates an inner side plan view the first arm of FIG. 33A.
Figure 33C:
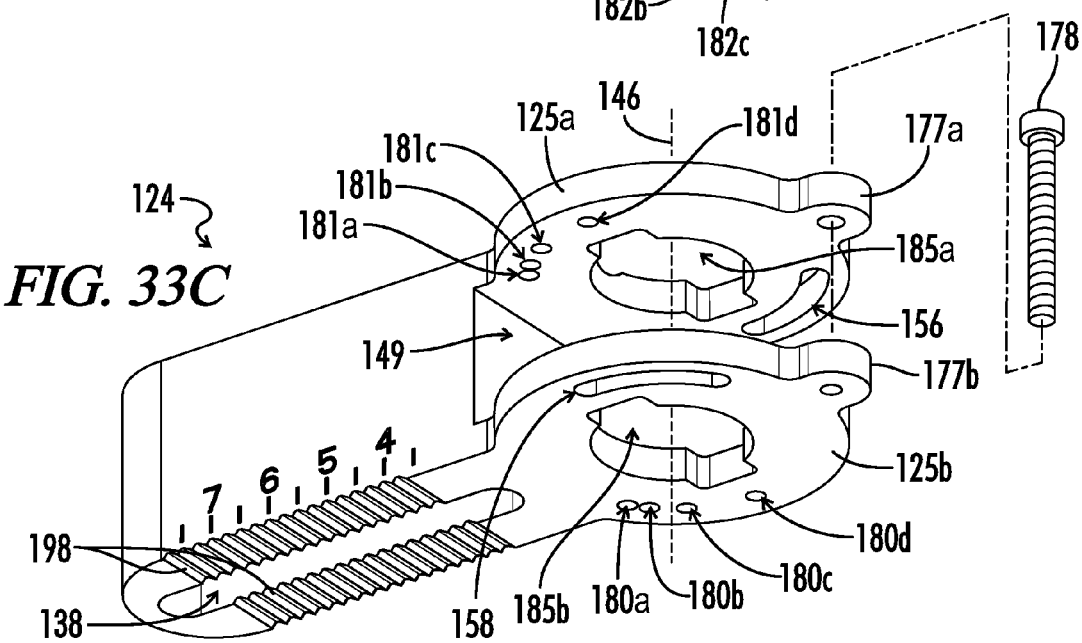
FIG. 33C illustrates a perspective view of the arm of FIG. 33A.

Referring now to FIGS. 33A-33C, first arm 124 includes an outer base plate 125a nearer the outer side of wheel clamp 120 and an inner base plate 125b nearer the inner side of wheel clamp 120. In some other embodiments, first arm 124 includes only one base plate. Outer base plate 125a includes an outer base plate aperture 185a defined along central axis 146. As seen in FIG. 33A, outer base plate aperture 185a includes first and second outer base plate aperture grooves 143, 145.

Similarly, inner base plate 125b includes an inner base plate aperture 185b aligned along central axis 146. As seen in FIG. 33B, inner base plate aperture 185b includes first and second inner base plate aperture grooves 163, 165 aligned with first and second outer base plate aperture grooves 143, 145 respectively. First inner base plate aperture groove 163 and first outer base plate aperture groove 143 are each substantially aligned with first clamp aperture groove 130, seen in FIG. 32A. Similarly, second inner base plate aperture groove 163 and second outer base plate aperture groove 143 are both substantially aligned with second clamp aperture groove 131.

Inner and outer base plates 125a, 125b define a hub gap 149 therebetween. Hub gap 149 is generally shaped to pivotally receive second arm base plate, or second arm socket 127, seen in FIG. 34C, and third arm base plate, or third arm socket 129, seen in FIG. 35C. Together, inner and outer base plates 125a, 125b, second arm socket 127 and third arm socket 129 form hub 144. Second arm socket 127 and third arm socket 129 are generally secured in hub gap 149 by a base plate fastener 178, seen in FIG. 33C. In some embodiments, an outer base plate screw flange 177a protrudes from outer base plate 125a, and an inner base plate screw flange 177b protrudes from inner base plate 125b. Base plate fastener 178 in some embodiments includes a threaded bolt extending through holes defined in inner and outer base plate screw flanges 177a, 177b.

Referring now to FIGS. 34A-34C, one embodiment of a second arm 126 is generally illustrated. Second arm 126 includes a second arm socket 127 extending therefrom. Second arm socket 127 includes a second arm socket aperture 187 generally aligned with inner and outer base plate apertures 185a, 185b along central axis 146. Second arm socket aperture 187 includes first and second aperture recesses 135a, 135b extending radially from second arm socket aperture 187. When second arm socket 127 is installed in hub gap 149, first aperture recess 135a is generally aligned with first outer base plate aperture groove 143, and second aperture recess 135b is generally aligned with second outer base plate aperture groove 145. It is understood that first aperture recess 135a defines a larger angular void than first outer base plate aperture groove 143 so that an uninterrupted longitudinal clearance groove is defined axially through hub 144 as first arm socket 127 rotates across a defined angular distance relative to inner and outer base plates 125a, 125b. Similarly, second aperture recess 135b defines a larger angular void than second outer base plate aperture groove 145 so that an uninterrupted longitudinal clearance groove is defined axially through hub 144 as first arm socket 127 rotates across a defined angular distance relative to inner and outer base plates 125a, 125b.

Referring now to FIG. 34A and FIG. 34C, a first pilot hole 191 is defined on second arm socket 127. When second arm socket 127 is positioned in hub gap 149, first pilot hole 191 is generally aligned with curved outer slot 156 defined in outer base plate 125a, seen in FIG. 33C. As seen in FIGS. 32A-32C, in some embodiments a first pilot rod, or first slot bolt, 179 protrudes through curved outer slot 156 and engages first pilot hole 191. First pilot rod 179 generally protrudes from second arm socket 127 and is received in curved outer slot 157. In some embodiments, first pilot hole 191 is threaded and first pilot rod 179 includes a threaded bolt. As second arm 126 rotates relative to hub 144 and relative to at least one other arm, first pilot rod 179 translates across the angular void defined by curved outer slot 156. Thus, curved outer slot 156 in some embodiments defines the angular rotational limits of second arm 126.

Figure 35A:
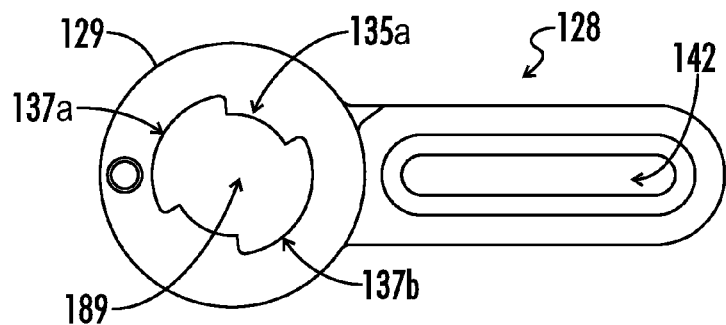
FIG. 35A illustrates an outer side plane view of one embodiment of a third arm in accordance with the present invention.
Figure 35B:
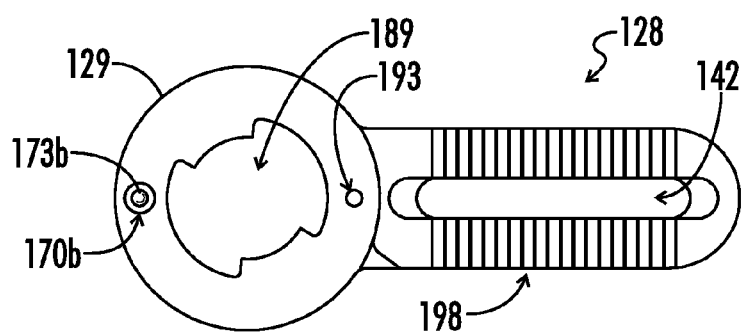
FIG. 35B illustrates an inner side plan view of the third arm of FIG. 35A.
Figure 35C:
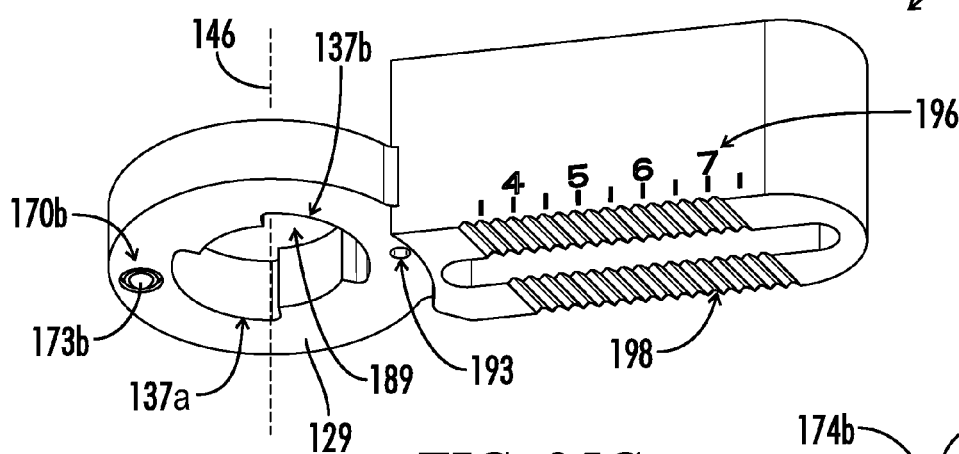
FIG. 35C illustrates a perspective view of the third arm of FIG. 35A.
Figure 36:
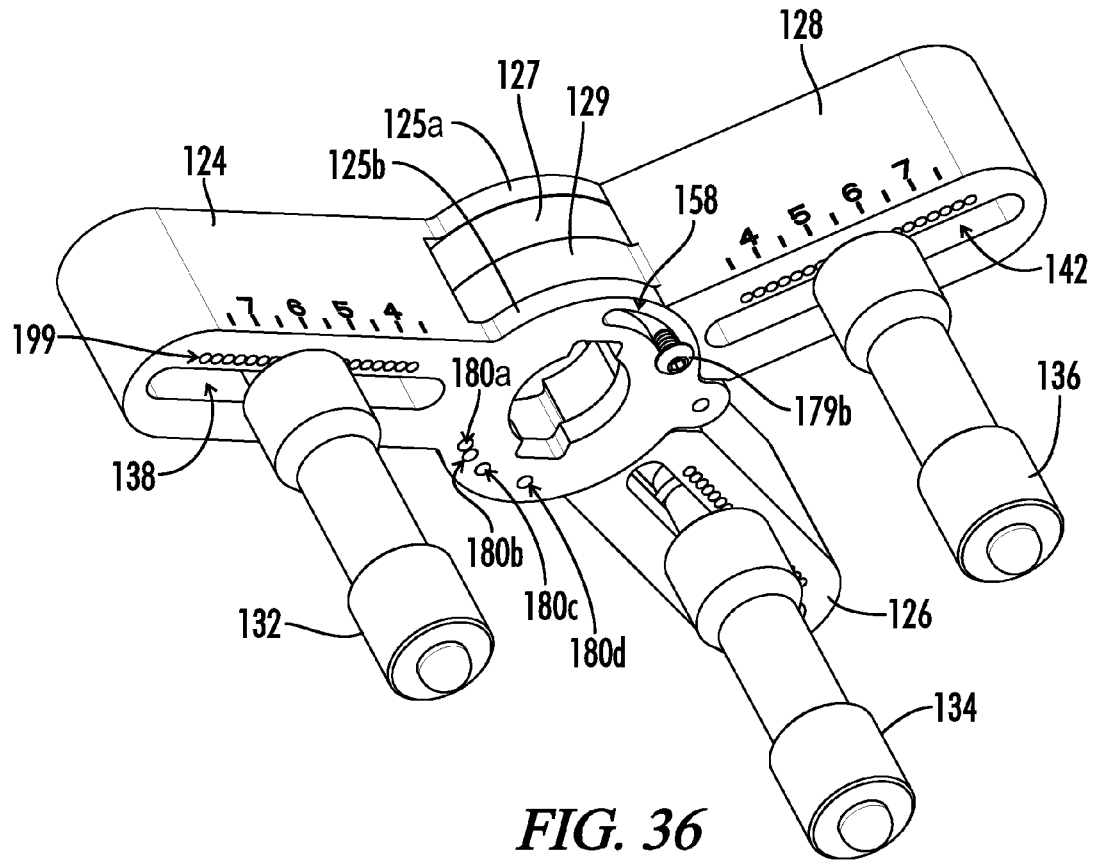
FIG. 36 illustrates a perspective view of one embodiment of a wheel clamp in accordance with the present invention.

Referring now to FIG. 33C, FIG. 35C and FIG. 36, a second pilot hole 193 is defined in third arm socket 129. A corresponding curved inner slot 158 is also defined in inner base plate 125b. When third arm socket 129 is positioned in hub gap 149 between second arm socket 127 and inner base plate 125b, as seen in FIG. 36, second pilot hole 193 is generally aligned with curved inner slot 158. A second pilot rod 179b extends through curved inner slot 158 and engages second pilot hole 193. In some embodiments, second pilot hole 193 is threaded and second pilot rod 179b includes a threaded bolt. As third arm 128 rotates relative to at least one other arm, second pilot rod 179b translates across the angular void defined by curved inner slot 158. Thus, curved inner slot 158 in some embodiments defines the angular rotation limits of third arm 128.

Referring again to FIGS. 32A-32C, in some embodiments it is desirable to provide a wheel clamp 120 having predetermined arm locations so that the clamp can be adjusted to the proper angular configuration prior to installation onto the shaft or rod of the wheel servicing machine. For example, a user may want to reposition the wheel clamp quickly from the quadrangular lug hole pattern configuration seen in FIG. 32A to the hexagonal lug hole pattern configuration seen in FIG. 32B without having to precisely measure and align the angles between respective arms. One embodiment of the present invention provides an arm-biasing mechanism for one or more arms 124, 126, 128 for quickly positioning the clamp in a desired lug hole pattern configuration.

Referring again to FIG. 34C, in one embodiment a first ball bearing spring detent 170a is disposed on the second arm socket 127. The first ball bearing spring detent 170a protrudes generally from second arm socket 127 toward outer base plate 125a when second arm socket 127 is installed in hub gap 149. As seen in more detail in FIG. 34D, first ball bearing spring detent 170a includes a spring cartridge 172a positioned in a hole in second base plate socket 127. A coil detent spring 174a is positioned in the cartridge 172a, and a ball bearing 173a is positioned in the cartridge. The ball bearing 173a is biased away from the cartridge by the spring 174a so that the ball bearing extends a detent height 139a above the second arm socket 127. In some embodiments, detent height 139a is between about 0.25 mm and about 3.0 mm. The first ball bearing 173a thus resiliently engages the outer base plate 125a when the second arm socket 127 is positioned in the base gap 149 between the outer base plate 125a and the third arm socket 129, as seen in FIG. 36.

Referring again to FIG. 33C, in some embodiments, the preferred angular positions of second arm 126 can be defined by one or more detent holes 181, or detent recesses, defined in outer base plate 125a. When second arm 126 is rotated to an angular position so that first ball detent 170a is aligned with a detent hole 181, the first ball bearing 173a resiliently engages the recess defined by the corresponding detent hole 181 and the second arm 126 is biased in that angular position. The second arm 126 can be moved to different angular positions by manually applying a sufficient amount of angular force against the second arm 126 to move the first ball bearing 173a downward into the first detent cartridge 172a against the first detent spring 174a.

In one embodiment, a first outer detent hole 181a, seen in FIG. 33A and FIG. 33C, is defined in outer base plate 125a corresponding to a first angular position for second arm 126. A second outer detent hole 181b is defined in outer base plate 125a corresponding to a second angular position for second arm 126. A third outer detent hole 181c is defined in outer base plate 125a corresponding to a third angular position for second arm 126. A fourth outer detent hole 181d is defined in outer base plate 125a corresponding to a fourth angular position.

As seen in FIG. 32A, in one embodiment, when second arm 126 is positioned to correspond to a quadrangular lug hole pattern configuration, first ball detent 170a engages fourth outer detent hole 181d, thereby releasably locking the second arm 126 in the angular position. As second arm 126 is rotated away from first arm 124, first ball detent 170a moves angularly toward first arm 124 so that first ball bearing 173a engages third outer detent hole 181c corresponding to a hexagonal lug hole pattern. When second arm 126 is rotated further relative to first arm 124, first ball detent 170a releasably engages detent holes corresponding to additional lug hole pattern configurations. It is understood that second arm 126 can be rotated in either angular direction without affecting the ability of first ball detent 170a to operatively engage corresponding outer detent holes 181 defined in outer base plate 125a.

Figure 35D:
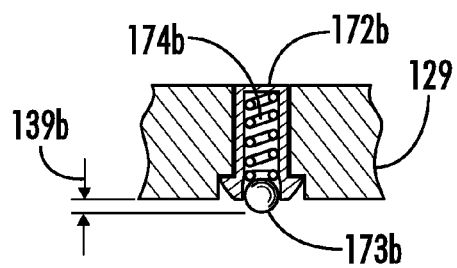
FIG. 35D illustrates a partial cross-sectional view of Section 35D-35D of FIG. 35C.

Referring now to FIGS. 35B and 35C, a second ball detent 170b can be positioned in a corresponding hole in third arm socket 129. When third arm socket 129 is positioned in hub gap 149 between second arm socket 127 and inner base plate 125b, as illustrated in FIG. 36, second ball detent 170b resiliently engages inner base plate 125b. In some embodiments, second ball detent 170*b* is similar to first ball detent 170*a*, as illustrated in the partial cross-sectional view in FIG. 35D. Second ball detent 170*b* includes a second detent cartridge 172*b* inserted in a hole in third arm socket 129. A second coil detent spring 174*b* is positioned in second detent cartridge 172*b*, and a second ball bearing 173*b* is biased away from cartridge 172*b* by second coil detent spring 174*b*. Second ball bearing 173*b* extends a second bearing distance 139*b* away from third arm socket 129. In some embodiments, second bearing distance 139*b* is between about 0.25 mm and about 3.0 mm. The second ball bearing 173*b* thus resiliently engages inner base plate 125*b* when the third arm socket 127 is positioned in the base gap 149 between inner base plate 125*b* and the second arm socket 127, as seen in FIG. 36.

In some embodiments, the preferred angular positions for third arm 128 can be defined by one or more inner detent holes 180 defined in inner base plate 125*b*. When third arm 128 is rotated to an angular position so that second ball detent 170*b* is aligned with a detent hole, second ball bearing 173*b* resiliently engages the recess defined by the detent hole and the third arm 128 is biased in that angular position. The third arm 128 can be moved to different angular positions by manually applying a sufficient amount of angular force against the third arm 128 to move the second ball bearing 173*b* into the second cartridge 172*b* against the second detent spring 174*b*.

Referring now to FIG. 33C and FIG. 36, in some embodiments, a first inner detent hole 180*a* is defined in inner base plate 125*b* corresponding to a first angular position for third arm 128. A second inner detent hole 180*b* is defined in inner base plate 125*b* corresponding to a second angular position for third arm 128. A third inner detent hole 180*c* is defined in inner base plate 125*b* corresponding to a third angular position for third arm 128. A fourth inner detent hole 180*d* is defined in inner base plate 125*b* corresponding to a fourth angular position for third arm 128. It is understood that fewer or more detent holes, or recesses, can be defined in inner and/or outer base plates 125*a*, 125*b* for engaging first and second ball detents 170*a*, 170*b*. It is also understood that other types of resilient detents can be used to bias first and/or second arms 126, 128 in various angular positions corresponding to various lug hole pattern configurations. When third arm 128 is rotated relative to at least one other arm, second ball detent 170*b* releasably engages subsequent detent holes corresponding to additional lug hole pattern configurations. It is understood that third arm 128 can be rotated in either angular direction and second ball detent 170*b* will operatively engage corresponding inner detent holes 180 defined in inner base plate 125*b*.

In some other embodiments not shown, first ball detent 170*a* may extend from the opposite side of second arm socket 127 and engage one or more detent holes, or detent recesses, defined in third arm socket 129. Similarly, in some embodiments, second ball detent 170*b* may extend from the opposite side of third arm socket 129 and resiliently engage one or more detent holes, or detent recesses, defined in second arm socket 127.

Figure 37:
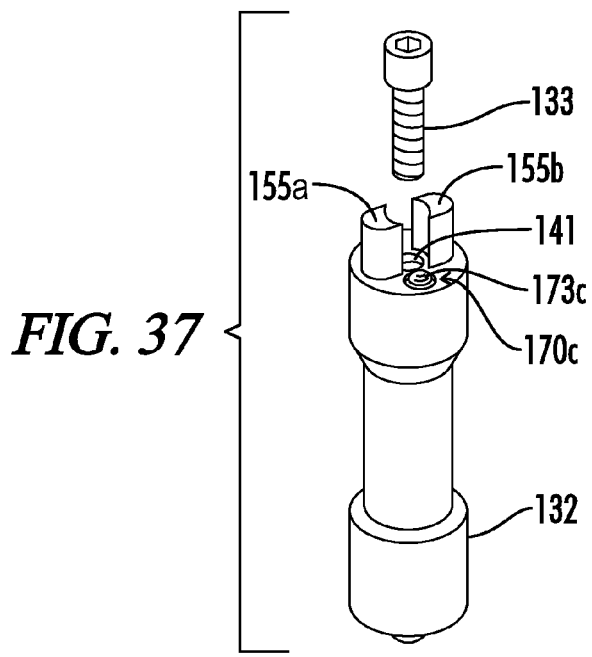
FIG. 37 illustrates a partially exploded view of one embodiment of a pin in accordance with the present disclosure.

Referring now to FIG. 37, a pin assembly includes a pin 132 and a pin fastener 133. Pin 132 includes a pin hole 141 adapted for receiving pin fastener 133. In some embodiments, pin fastener 133 is a threaded bolt and pin hole 141 includes corresponding threads. As seen in FIG. 32A, each arm includes a corresponding radial slot. For example, first arm 124 includes a first radial slot 138, second arm 126 includes a second radial slot 140, and third arm 128 includes a third radial slot 142. A pin fastener 133 is generally inserted in each radial slot. First pin fastener 133*a* is inserted through first radial slot 138. Second pin fastener 133*b* is inserted through second radial slot 140. Third pin fastener 133*c* is inserted through third radial slot 142. Each pin fastener 133*a*, 133*b*, 133*c* engages a corresponding pin 132, 134, 136 respectively, seen in FIG. 36. In some embodiments, each pin fastener is a threaded bolt. In some embodiments, the bolt head is dimensioned so that the bolt head cannot rotate in its corresponding slot, allowing each respective pin to be rotated onto a corresponding bolt without a bolt driver tool.

As seen in FIG. 37, at least one pin 132 in some embodiments can include a pin ball detent 170*c* protruding from an end of pin 132 near pin hole 141. Pin ball detent 170*c* can include a detent cartridge and a detent spring biasing pin ball bearing 173*c* away from pin 132. Pin ball bearing 173*c* generally engages one or more detent ridges 198 defined on a corresponding arm 124, 126 or 128, seen in FIG. 33C, FIG. 34B, FIG. 35C. Pin ball bearing 173*c* generally engages a detent ridge 198 to better secure the pin in a radial position along its corresponding arm. The pin can generally be radially repositioned by loosening the corresponding pin fastener and moving pin radially along the arm. When the desired new position is reached, the pin fastener is tightened and the ball bearing engages a detent ridge. In some other embodiments, the pin ball bearing engages one or more corresponding detent recesses, or detent holes, defined in the inner side of the corresponding arm, as illustrated generally by detent holes 199 in FIG. 13 and FIG. 36.

It is understood that in some embodiments each pin may include a ball detent and each arm may include corresponding detent ridges, detent recesses, detent holes or combinations thereof. Also seen in FIG. 37, pin 132 can include one or more extension structures, or slot keys 155, protruding from an end of the pin. Each slot key 155 generally protrudes into and is aligned with a radial slot 138, 140, 142 on a corresponding arm 124, 126, 128. As seen in FIG. 37, two slot keys 155*a*, 155*b* can be angularly aligned with a corresponding radial slot such that the slot keys guide the pin along the radial slot when the pin is being radially repositioned. As such, the slot keys prevent the pin from rotating relative to the arm. Such rotation might undesirably cause the pin bearing 173*c* to become misaligned with one or more detent ridges, detent recesses, or detent holes in the corresponding arm. Also seen in FIG. 13, one or more arms 124, 126, 126 can include radial position indicia 184 located on the arm to indicated the radial distance along the arm for properly positioning one or more pins. It will be appreciated by those of skill in the art that the embodiments of the wheel clamp illustrated in FIGS. 13, 14 and 32A-35C include a few of many different configurations for achieving the objectives of the present invention. It is further understood that such exemplary embodiments are not intended as a limitation upon the scope of this invention.

In another embodiment of the present invention, a method is provided of using an adjustable wheel holding assembly to engage and detachably secure a vehicular wheel to a wheel service machine for servicing wheels of a first or "normal mount" type in which an inflatable tire is removable from a first side of the wheel and of a second or "reverse mount" type in which the tire is removable from a second side of the wheel. The wheel has a central hub hole and a plurality of lug holes spaced radially outwardly from the hub hole and a tire removable mounted thereon. The wheel service machine has a wheel support and a rotating shaft extending from the support. The wheel holding assembly includes a plurality of pins shaped to engage lug holes on the wheel.

The method includes (when the tire is removable from the first side of the wheel) placing a centering cone over the shaft, placing the wheel over the shaft with the second side of the wheel engaging the cone and the first side of the wheel facing away from the wheel support, adjusting a position of at least one of the pins on the assembly to align the pins with a plurality of lug holes on the wheel, placing the assembly over the shaft with the pins facing the first side of the wheel to engage the lug holes, and locking the wheel to the machine.

When the tire is removable from the second side of the wheel, the method can further include placing the assembly over the shaft with the pins facing away from the wheel support, adjusting a position of at least one of the pins on the assembly to align the pins with a plurality of lug holes on the wheel, placing the wheel over the shaft, with the first side of the wheel facing the wheel support and the pins, positioning the wheel with the lug holes bearing down in engagement with the pins, placing a centering cone over the shaft to engage the second side of the wheel, and locking the wheel to the machine.

Each of the steps of adjusting a position of the pin may include adjusting both a radial position and an angular position of the pin with respect to the shaft.

Each of the steps of locking the wheel to the machine may include retracting the shaft towards the wheel support.

In some embodiments, the present invention provides a method of using an adjustable wheel holding assembly to engage and detachably secure a vehicular wheel to a wheel servicing machine for servicing wheels of both a first type in which an inflatable tire is removable from a first side of the wheel and of a second type in which the tire is removable from a second side of the wheel, the wheel having a center hub hole and a plurality of lug holes spaced radially outwardly from the hub hole, first and second sides, and a tire removably mounted thereon. The wheel service machine has a wheel support and a rotating shaft extending from the support, and the assembly has a plurality of pins shaped to engage lug holes on the wheel. The method may include the steps of:

(a) when the tire is removable from the first side of the wheel,
　placing a centering cone over the shaft,
　placing the wheel over the shaft with the second side of the wheel engaging the cone and the first side of the wheel facing away from the wheel support,
　adjusting a position of at least one of the pins on the assembly to align the pins with a plurality of lug holes on the wheel,
　placing the assembly over the shaft with the pins facing the first side of the wheel to engage the lug holes,
　locking the wheel to the machine; and
(b) when the tire is removable from the second side of the wheel,
　placing the assembly over the shaft with the pins facing away from the wheel support,
　adjusting a position of at least one of the pins on the assembly to align the pins with a plurality of lug holes on the wheel,
　placing the wheel over the shaft, with the first side of the wheel facing the wheel support and the pins,
　positioning the wheel with the lug holes bearing down in engagement with the pins,
　placing a centering cone over the shaft to engage the second side of the wheel, locking the wheel to the machine.

The method can include the steps described above wherein each of the steps of adjusting a position of the pin include adjusting both a radial position and an angular position of the pin with respect to the shaft. Additionally, the method can include the steps described above wherein each of the steps of locking the wheel to the machine comprises retracting the shaft towards the wheel support.

Thus, although there have been described particular embodiments of the present invention of a new and useful Self-Advancing Wheel Servicing Tool Assembly, it is not intended that such references be construed as limitations upon the scope of this invention except as set forth in the following claims.

What is claimed is:

1. A wheel servicing machine for applying force to a tire on a wheel assembly mounted on the machine, the apparatus comprising:
　a base;
　a rotatable shaft extending from the base, the rotatable shaft defining a shaft axis of rotation;
　a first support arm extending longitudinally from the base, the first support arm including a distal end extending away from the base wherein the first support arm is linearly moveable relative to the base;
　a first travel stage mounted on the distal end of the first support arm, the first travel stage defining a first travel axis, and
　a first roller tool disposed on the first travel stage,
　wherein the first travel axis is oriented at a non-perpendicular first travel angle relative to a reference axis, wherein the reference axis is oriented substantially parallel to the shaft axis of rotation.

2. The apparatus of claim 1, wherein the first travel angle is greater than ninety degrees.

3. The apparatus of claim 1, wherein the first travel stage further comprises:
　a first stage base;
　a first stage platform slidably mounted on the first stage base and oriented for travel along the first travel axis; and
　a first ratchet assembly disposed on the first travel stage between the first stage base and the first stage platform, the ratchet assembly being operative for selectively preventing radial motion of the first stage platform in one direction.

4. The apparatus of claim 3, wherein the ratchet assembly further comprises:
　a base ratchet member disposed on the first stage base; and
　a platform ratchet member disposed on the first stage platform,
　wherein the base ratchet member engages the platform ratchet member as first stage platform moves generally radially relative to the tire on first stage base.

5. The apparatus of claim 3, further comprising:
　a powered ratchet cylinder attached to first stage base;
　a ratchet rod extending from the powered ratchet cylinder and attached to the base ratchet member;
　a powered arm cylinder attached to the first support arm; and
　a longitudinal control operatively connected to both the powered ratchet cylinder and the powered arm cylinder, wherein the longitudinal control is configured to operate both the powered arm cylinder and the powered ratchet cylinder simultaneously.

6. The apparatus of claim 3, further comprising a locking pin slidably extending through the first stage base for selectively blocking translation of the first stage platform.

7. The apparatus of claim 1, further comprising:
　a second support arm extending from the base;
　a second travel stage mounted on the second support arm defining a second travel axis; and
　a second tire roller tool rotatably disposed on the second travel stage,
　wherein the second linear travel axis is oriented at a non-perpendicular second travel angle relative to a reference axis, the reference axis being oriented substantially parallel to the shaft axis of rotation.

8. The apparatus of claim 7, wherein the first and second travel angles are each greater than ninety degrees.

9. The apparatus of claim 8, further comprising:
a dismounting tool attached to the second support arm, the dismounting tool having a free end extending toward a tire when mounted on the apparatus; and
a powered actuator attached to the dismounting tool for projecting the dismounting tool outward from the second support arm toward a tire when mounted on the apparatus.

10. The apparatus of claim 1, wherein the first travel angle is between about 95 degrees and about 135 degrees.

11. The apparatus of claim 1, further comprising:
a laser alignment module attached to the base, the laser alignment module oriented toward the tire for selectively illuminating a tire when mounted on the shaft with a laser beam at an alignment location; and
the alignment location being longitudinally aligned with the first roller tool.

12. The apparatus of claim 1, further comprising an air jet orifice attached to the base oriented toward a tire when mounted on the shaft for blasting a jet of air toward the tire.

13. The apparatus of claim 12, further comprising: a valve connected to the air jet orifice for selectively releasing pressurized air; a compressed air tank attached to the base; and a hose operatively connecting the reservoir to the valve.

14. A wheel servicing machine for applying force to a tire positioned on the machine, the machine comprising:
a base;
a first support arm extending from the base toward the tire, the first support arm being longitudinally moveable between the tire and the base;
a first tool assembly including a ratcheting linear travel stage disposed on the first support arm;
a powered cylinder disposed on the base operatively connected to the first support arm for moving the first support arm longitudinally relative to the base; and
a powered ratchet cylinder disposed on the linear travel stage operative for releasing the ratchet when the first support arm is moved longitudinally.

15. The apparatus of claim 14, further comprising:
a second support arm extending from the base;
a platform arm extending from the second support arm generally toward the shaft, the platform arm being longitudinally moveable relative to the second support arm;
a second tool assembly disposed on the platform arm.

16. The apparatus of claim 15, the second tool assembly further comprising:
a second ratcheting travel stage;
a second tire roller tool;
a dismounting tool; and
a platform tool powered cylinder connected to the dismounting tool operative for extending and retracting the dismounting tool.

17. A ratcheting travel stage apparatus for use on a support arm for supporting a roller tool on a wheel servicing machine, the apparatus comprising:
a stage base;
a stage platform slidably disposed on the stage base, the stage platform defining a stage travel axis;
a powered ratchet cylinder attached to the stage base having a ratchet rod projecting toward the stage platform, the powered ratchet cylinder oriented substantially perpendicular to the stage travel axis;
a base ratchet member attached to ratchet rod;
a platform ratchet member attached to the stage platform engaging the base ratchet member; and
a longitudinal control operatively connected to both the support arm and the powered ratchet cylinder.

18. A tire changer apparatus for removing a tire from a wheel, the apparatus comprising:
a base;
a rotatable shaft extending from the base;
a support arm extending from the base, the support arm including a ratcheting travel stage oriented at a non-perpendicular travel angle relative to a reference axis, the reference axis oriented parallel to the shaft axis of rotation, the support arm including a longitudinal control for controlling the longitudinal position of the support arm relative to the shaft; and
a first roller tool extending from the ratcheting travel stage, wherein the first roller tool is both longitudinally and radially moveable relative to the shaft using only the longitudinal control.

19. The apparatus of claim 18, wherein the first roller tool engages the tire and advances radially toward the shaft in a radial travel direction when the support arm is extended toward the tire.

20. The apparatus of claim 19, wherein the ratcheting travel stage is operative for preventing the first roller tool from reversing radial translation direction.

21. A tire changing apparatus for performing wheel servicing operations on a tire, the apparatus comprising:
a base;
a rotatable shaft extending from the base;
a support arm extending from the base toward the tire, the support arm including a ratcheting travel stage disposed thereon; and
a first roller tool mounted on the ratcheting travel stage, the first roller tool engaging the tire and self-advancing radially toward the shaft when the first roller tool is pressed longitudinally against the tire.

* * * * *